US012748523B2

(12) United States Patent
Brewer et al.

(10) Patent No.: US 12,748,523 B2
(45) Date of Patent: Sep. 29, 2026

(54) GENERATION AND DISPLAY OF LINKAGE BETWEEN ELEMENTS OF A FILE

(71) Applicant: iHeartMedia Management Services, Inc., San Antonio, TX (US)

(72) Inventors: Joseph Brewer, Garden City, NY (US); Jody Sporn, Montclair, NJ (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/186,082

(22) Filed: Nov. 9, 2018

(65) Prior Publication Data

US 2019/0227676 A1 Jul. 25, 2019

Related U.S. Application Data

(60) Provisional application No. 62/620,933, filed on Jan. 23, 2018.

(51) Int. Cl.

| | |
|---|---|
| ***G06F 3/0482*** | (2013.01) |
| ***G06F 3/0484*** | (2022.01) |
| ***G06F 8/38*** | (2018.01) |
| ***G06F 16/80*** | (2019.01) |
| ***G06F 16/907*** | (2019.01) |
| ***G06Q 30/0601*** | (2023.01) |

(52) U.S. Cl.

CPC .......... *G06F 3/0482* (2013.01); *G06F 3/0484* (2013.01); *G06F 8/38* (2013.01); *G06F 16/80* (2019.01); *G06F 16/907* (2019.01); *G06Q 30/0633* (2013.01)

(58) Field of Classification Search

None

See application file for complete search history.

(56) References Cited

U.S. PATENT DOCUMENTS

| | | | | |
|---|---|---|---|---|
| 9,842,362 | B2 * | 12/2017 | Kim | F25D 29/00 |
| 2003/0009385 | A1 * | 1/2003 | Tucciarone | G06Q 30/0601 705/26.1 |
| 2003/0030844 | A1 * | 2/2003 | Matsui | G06K 19/06037 358/1.15 |
| 2009/0118845 | A1 * | 5/2009 | Eldridge | G06F 8/71 700/86 |
| 2010/0306080 | A1 * | 12/2010 | Trandal | G06Q 10/10 705/26.8 |
| 2011/0029535 | A1 * | 2/2011 | Cole | G06Q 10/10 707/740 |
| 2012/0151418 | A1 * | 6/2012 | Conzola | G06F 16/332 715/853 |

(Continued)

*Primary Examiner* — Haimei Jiang

(74) *Attorney, Agent, or Firm* — Edward J. Marshall

(57) ABSTRACT

A method includes receiving, at a device, a first file including a plurality of elements. The first file is represented in a markup language and complies with an inventory availability format. The method also includes receiving, at the device, a second file that indicates linkage between multiple elements of the first file. The method further includes generating, at the device, a graphical user interface (GUI) indicating the linkage between the multiple elements. The GUI includes at least one option that is selectable to initiate performance of an aggregate operation on the multiple elements. The method also includes providing the GUI from the device to a display. Other aspects are also disclosed.

11 Claims, 12 Drawing Sheets

(56) References Cited

U.S. PATENT DOCUMENTS

| | | | | |
|---|---|---|---|---|
| 2012/0265744 | A1* | 10/2012 | Berkowitz | G06Q 30/0613 707/705 |
| 2014/0358267 | A1* | 12/2014 | Littlejohn | H04N 21/26241 700/94 |
| 2015/0149298 | A1* | 5/2015 | Tapley | G06Q 30/0633 705/14.66 |
| 2015/0193123 | A1* | 7/2015 | Inukonda | G06Q 10/10 715/780 |
| 2015/0193860 | A1* | 7/2015 | Walker | G06Q 30/0635 705/26.81 |
| 2015/0278906 | A1* | 10/2015 | Navani | G06Q 30/0631 705/26.7 |
| 2016/0231880 | A1* | 8/2016 | Sirpal | H04N 21/4882 |
| 2016/0292760 | A1* | 10/2016 | Pastore | G06Q 30/0611 |
| 2019/0200844 | A1* | 7/2019 | Shelton, IV | H04L 63/123 |

* cited by examiner

GENERATION AND DISPLAY OF LINKAGE BETWEEN ELEMENTS OF A FILE

I. CROSS REFERENCE TO RELATED APPLICATIONS

The present application claims the benefit of U.S. Provisional Patent Application No. 62/620,933, entitled "GENERATION AND DISPLAY OF LINKAGE BETWEEN ELEMENTS OF A FILE," filed Jan. 23, 2018, which is expressly incorporated by reference herein in its entirety.

II. FIELD

The present disclosure relates to systems and methods of generating and displaying linkage between elements of a file.

III. BACKGROUND

Users may rely on electronic files to communicate information. To ease the communication process, the files may comply with a format (e.g., an industry standard). The format may not be designed to support indication of linkage between multiple elements of a file. A user who is interested in linking multiple elements of a first file is unable to include an indication of the linkage in the first file while maintaining compliance of the first file with the format. In a particular example, the first file complies with an inventory availability format and indicates available inventory. To illustrate, the first file may indicate availability of a first item at a first seller and a second item at a second seller. A broker (e.g., the user) may be interested in using the first file to indicate availability of a package including the first item and the second item and providing the first file to a buyer. However, the broker is unable to indicate a link between the first item and the second item in the first file and maintain compliance of the first file with the inventory availability format. In another example, the first file complies with a construction parts format. A user may be interested in indicating that a first hardware part and a second hardware part indicated by the first file form a package. For example, the first hardware part may be compatible with the second hardware part. Because the construction parts format does not include linkage information, the user is unable to indicate a link between the first hardware part and the second hardware part in the first file.

IV. SUMMARY

Systems and methods of generating and displaying linkage between elements of a file are disclosed. In a particular implementation, a first file is in compliance with a format (e.g., an industry standard format) that does not provide for indicating linkage between file elements. A package file generator of a first device generates a package file indicating linkage between multiple elements of the first file. For example, the package file generator generates a GUI (e.g., a configuration GUI) to enable selection of elements of the first file. The GUI indicates the elements of the first file. The package file generator provides the GUI to a display. The package file generator generates the package file in response to receiving a user input indicating that a first element is to be linked to a second element. The package file indicates that a first identifier of the first element is linked to a second identifier of the second element. The first device provides the first file and the package file to a second device.

A file analyzer of the second device generates a GUI (e.g., a package GUI) based on the first file and the package file. The package GUI indicates that the first element is linked to the second element. The first device is thus able to provide the first file that complies with the format (e.g., the industry standard format) along with the package file that indicates linkage between elements of the first file. The first device is able to provide the linkage information in the package file without duplicating all of the information that is included in the first file while maintaining backward compatibility with a recipient device (e.g., a legacy device) that is not configured to process the package file. A legacy device may generate a GUI based on the first file. The GUI generated by the legacy device may indicate the elements of the first file without indicating linkage between the elements of the first file. A non-legacy device generates a GUI based on the first file and the package file. The GUI generated by the non-legacy device indicates the elements of the first file and indicates linkage between the elements of the first file.

In a particular aspect, a method includes receiving, at a device, a first file including a plurality of elements. The first file is represented in a markup language and complies with an inventory availability format. The method also includes receiving, at the device, a second file that indicates linkage between multiple elements of the first file. The method further includes generating, at the device, a graphical user interface (GUI) indicating the linkage between the multiple elements. The GUI includes at least one option that is selectable to initiate performance of an aggregate operation on the multiple elements. The method also includes providing the GUI from the device to a display.

In another particular aspect, a method includes receiving, at a first device from a second device, a first file including a plurality of elements. The first file is represented in a markup language and complying with an inventory availability format. The method also includes receiving user input at the first device. The method further includes generating, based on the user input, a second file that indicates linkage between multiple elements of the first file. The method also includes providing, from the first device to a third device, the first file and the second file.

Aspects, advantages, and features of the present disclosure will become apparent after review of the entire application, including the following sections: Brief Description, Detailed Description, and the Claims.

V. BRIEF DESCRIPTION

Figure 1:
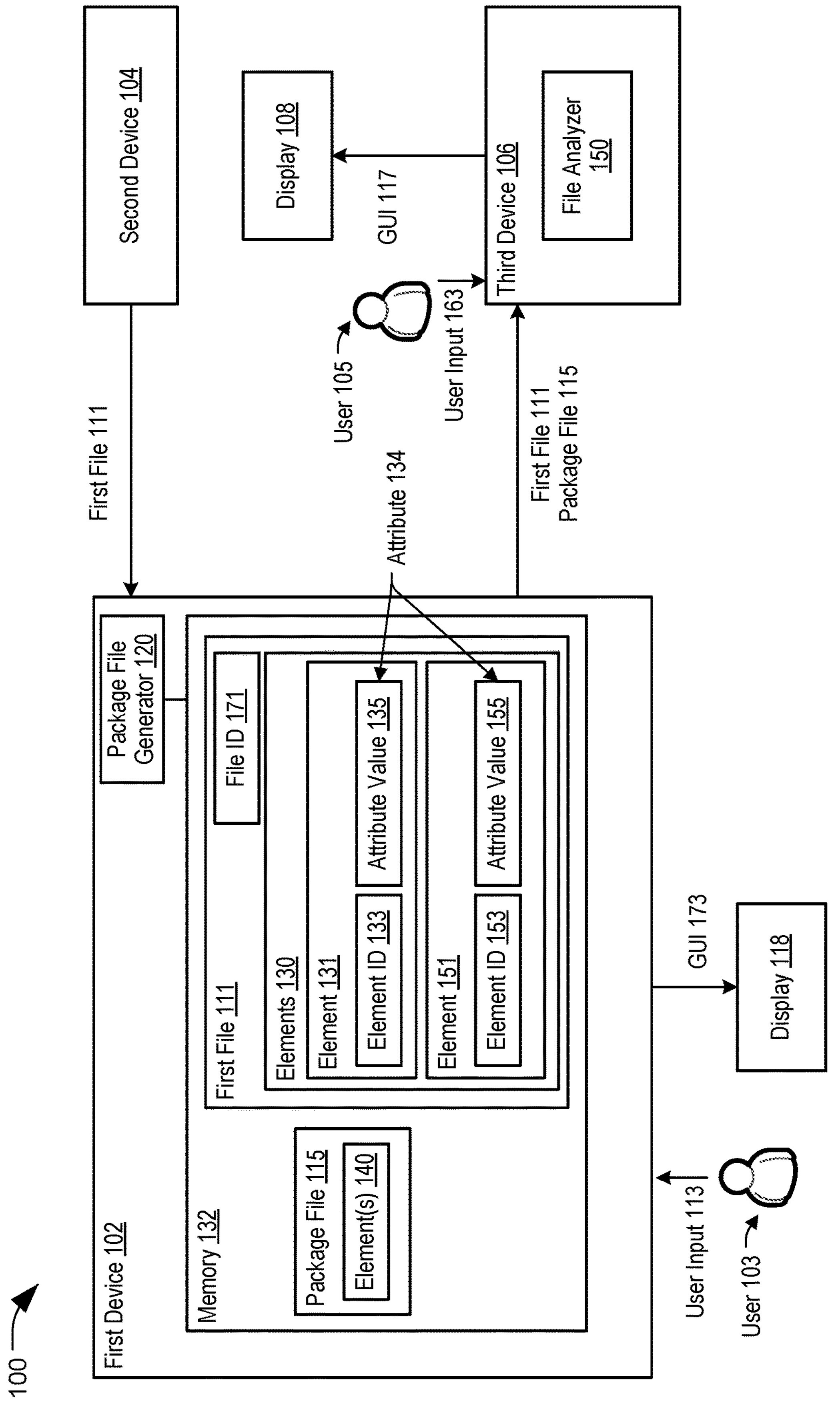
FIG. 1 is a block diagram of a particular illustrative aspect of a system that is operable to generate and display linkage between elements of a file.
Figure 9:
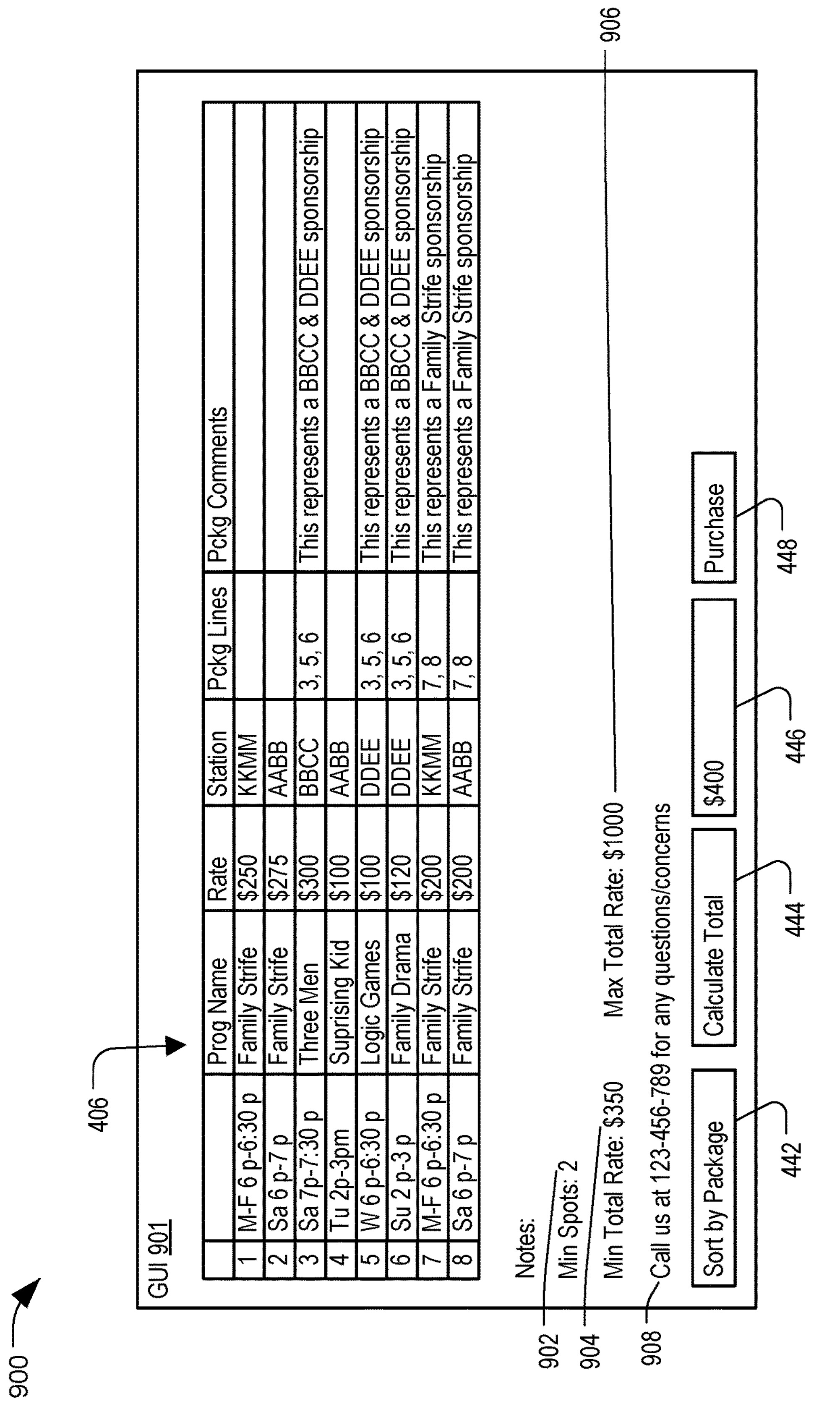
FIG. 9 is a diagram to illustrate an aspect of a graphical user interface generated by the system of FIG. 1.
Figure 10:
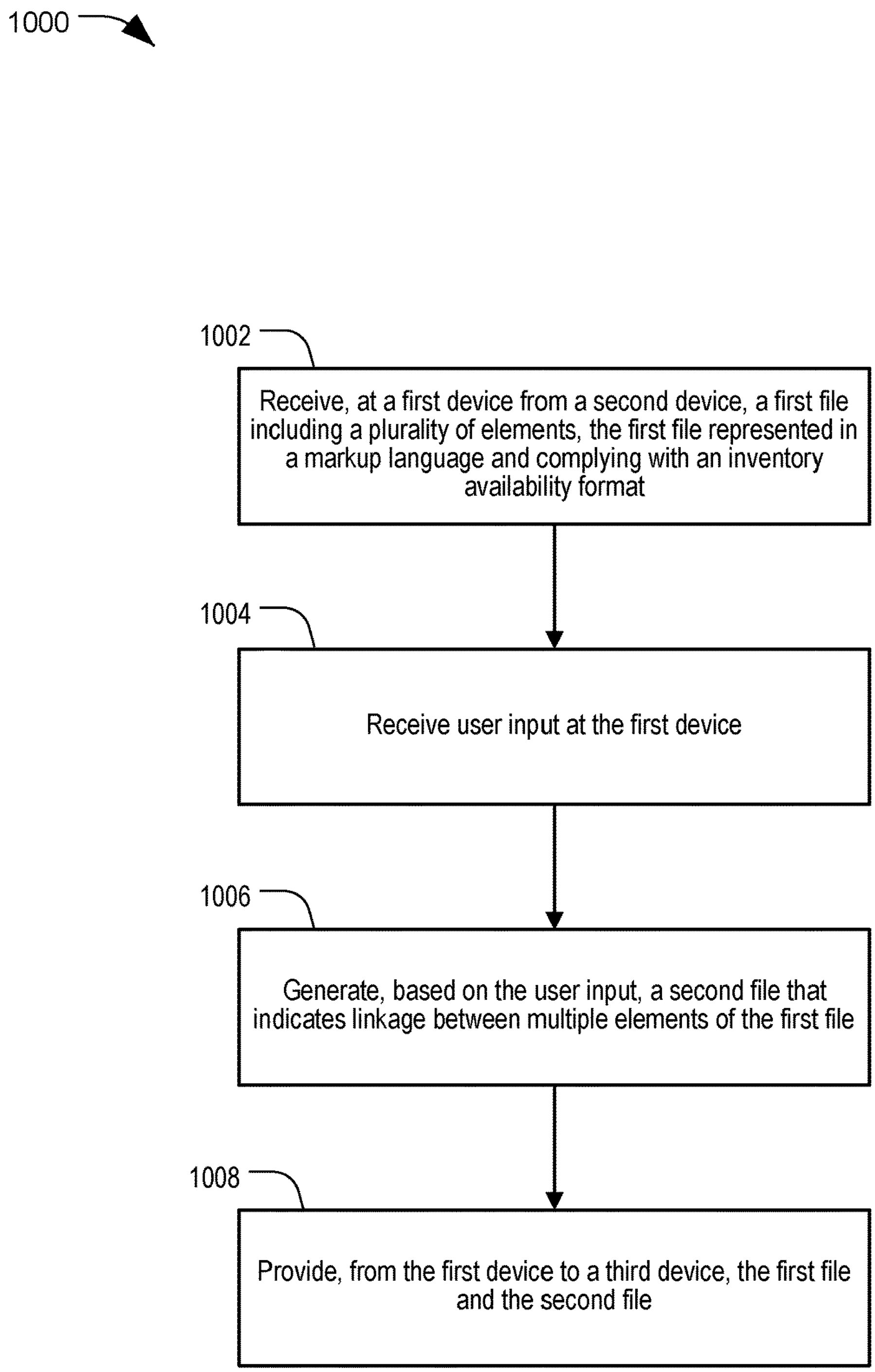
FIG. 10 is a flowchart to illustrate an aspect of a method of generating a second file that indicates linkage between elements of a first file that may be performed by the system of FIG. 1.
Figure 11:
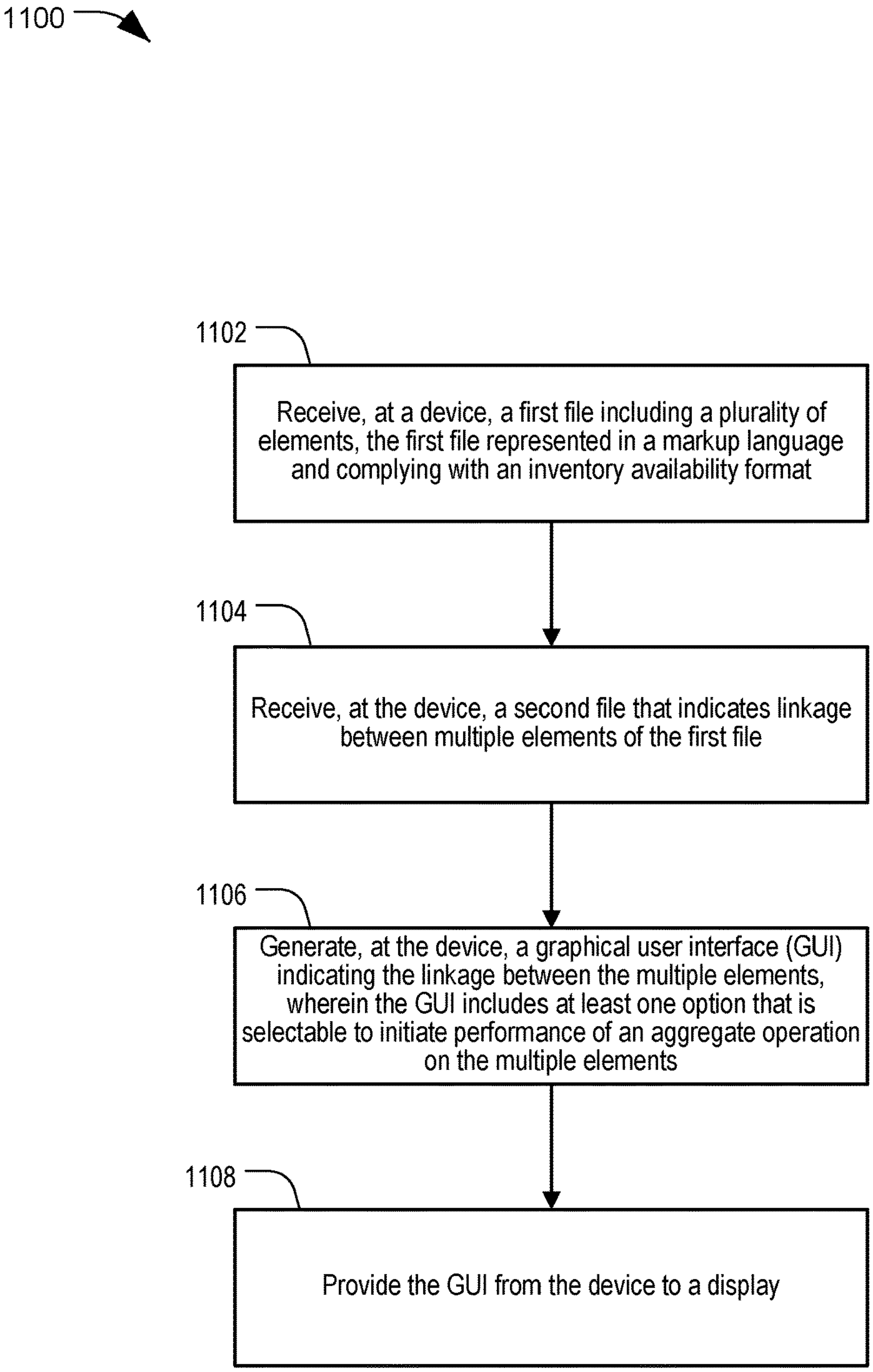
Figure 12:
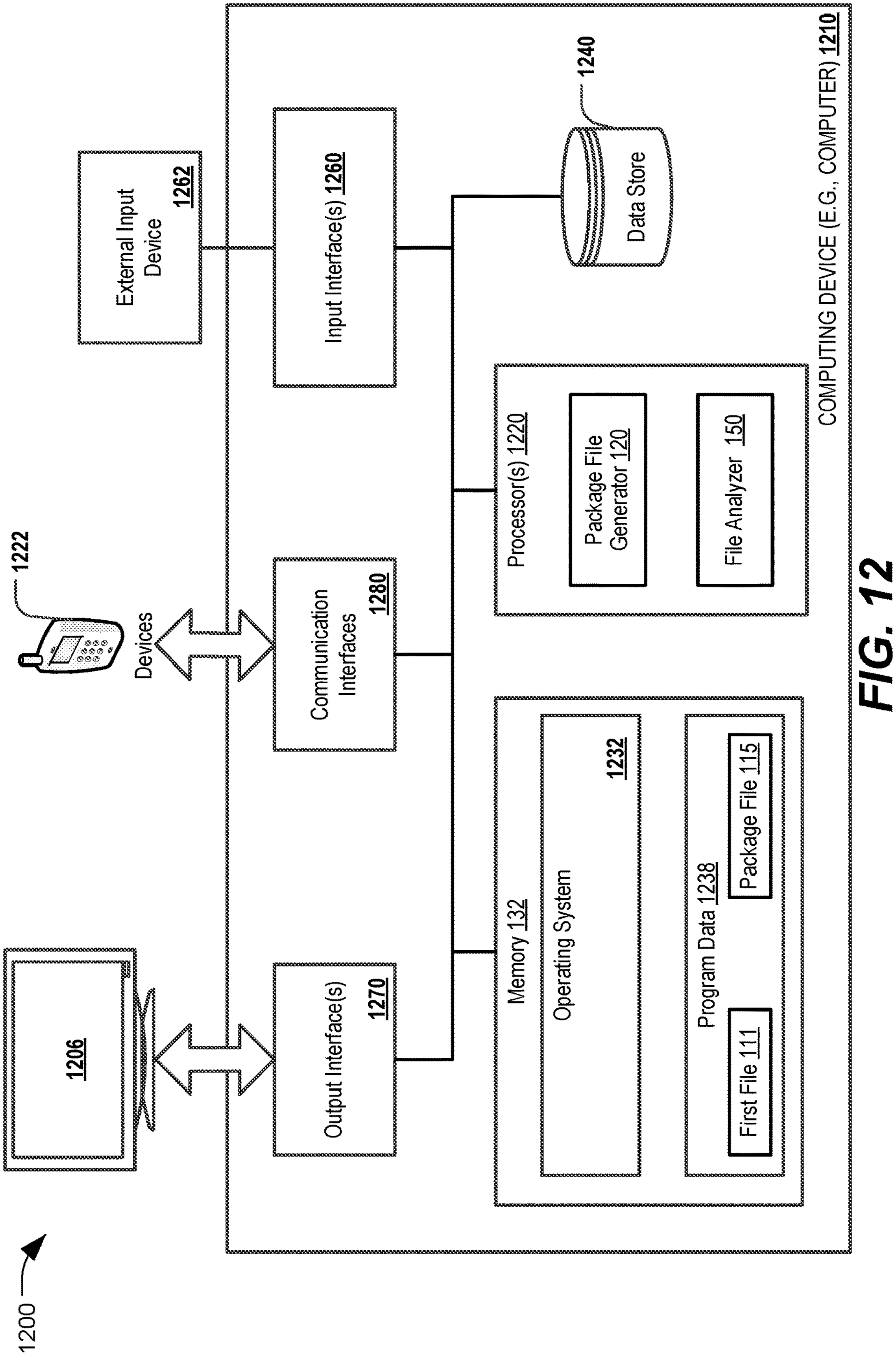

FIG. 11 is a flow chart to illustrate an aspect of a method of displaying linkage between elements of a first file that may be performed by the system of FIG. 1; and FIG. 12 is a block diagram of a device operable to generate a second file indicating linkage between elements of a first file and/or display the linkage between the elements of the first file in accordance with the systems, devices, and methods of FIGS. 1-11.

VI. DETAILED DESCRIPTION

The terminology used herein is for the purpose of describing particular aspects only and is not intended to be limiting of the claims. As used herein, the singular forms "a," "an," and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring to FIG. 1, a particular illustrative aspect of a system is disclosed and generally designated 100. The system 100 includes a first device 102. The first device 102 may be communicatively coupled to a second device 104, to a third device 106, or to both. For example, the first device 102 may be coupled, via a network, to the second device 104, to the third device 106, or to both. The network may include a wired network, a wireless network, or both.

The first device 102 is coupled to a display 118. In a particular aspect, the first device 102 includes the display 118. The first device 102 includes a package file generator 120 coupled to memory 132. The package file generator 120 is configured to generate a package file 115 indicating linkage between multiple elements of a first file 111. The package file 115 may be represented in a markup language (e.g., XML). The memory 132 is configured to store the first file 111, the package file 115, or both.

The third device 106 is coupled to a display 108. In a particular aspect, the third device 106 includes the display 108. The third device 106 includes a file analyzer 150. The file analyzer 150 is configured to generate, based on the first file 111 and the package file 115, a GUI 117 indicating linkage between multiple elements of the first file 111.

During operation, the first device 102 may receive the first file 111 from the second device 104. It should be understood that receiving the first file 111 from a single device is provided as an illustrative example. In some implementations, the first device 102 may receive multiple files from multiple sources (e.g., devices) and may generate the first file 111 by combining the multiple files. The first file 111 is in compliance with a particular format (e.g., an industry standard format), such as an inventory availability format, a construction parts format, or a software components list format. The first file 111 may be represented in a markup language (e.g., an eXtensible markup language (XML)). The first file 111 may include a file identifier (ID) 171, such as a name, a serial number, or both. An indication of linkage between multiple elements of the first file 111 is absent from the first file 111. For example, the particular format does not provide for the indication of linkage between elements of the first file to be included in the first file 111. A file is not considered to be in compliance with the particular format if the file includes an indication of linkage between multiple elements of the file.

The package file generator 120 generates a GUI 173 based on the first file 111. The GUI 173 may enable a user 103 to update the first file 111, as further described with reference to FIG. 2. For example, the package file generator 120 may receive a user input 113 from the user 103 and may update the first file 111 based on the user input 113. The first file 111 may include a plurality of elements 130. For example, the elements 130 may include an element 131 and an element 151. In a particular aspect, the elements 130 include the element 131, the element 151, or both, prior to the update to the first file 111. In an alternative aspect, the first file 111 is updated, based on the user input 113, to include the element 131, the element 151, or both.

In some implementations, a particular element of the elements 130 may indicate that a radio advertising spot is available. Attributes of the particular element may indicate information regarding the radio advertising spot. For example, the element 131 may indicate that a first radio advertising spot is available. Attributes of the element 131 may indicate information regarding the first radio advertising spot, such as a radio station, a rate, a title of a radio show that includes the first radio advertising spot, etc. In some implementations, a particular element of the elements 130 may indicate that a hardware part is available. Attributes of the particular element may indicate information regarding the hardware part. For example, the element 131 may indicate that a first hardware part is available. Attributes of the element 131 may indicate information regarding the hardware part, such as a part serial number, a manufacturing date, a cost, etc.

Each of the elements 130 may include an ID of the element. For example, the element 131 includes an element ID 133 (e.g., a first unique element ID) and the element 151 includes an element ID 153 (e.g., a second unique element ID). The particular format may indicate that a particular element includes one or more attributes. In a particular example, the particular format indicates that a particular element includes an attribute 134. The element 131 may have an attribute value 135 of the attribute 134 and the element 151 may have an attribute value 155 of the attribute 134. The GUI 173 may indicate that the first file 111 includes the element 131 having the attribute value 135 for the attribute 134 and the element 151 having the attribute value 155 for the attribute 134.

The GUI 173 may enable the user 103 to indicate one or more of the elements 130 that are to be linked. For example, the user 103 may select one or more of the elements 130 to be linked via the GUI 173, and the package file generator 120 may receive the user input 113 indicating that one or more elements are to be linked, as further described with reference to FIGS. 3, 5, and 7. The package file generator 120 may, based on the user input 113, generate (or update) the package file 115 to indicate the linkage between one or more of the elements 130, as further described with reference to FIGS. 3, 5, and 8. For example, one or more elements of the package file 115 may indicate that the element 131 is linked to the element 151. To illustrate, the package file 115 may include a first element indicating a package identifier, a second element indicating the package identifier and the element ID 133 of the element 131, and a third element indicating the package identifier and the element ID 153 of the element 151. The second element indicates that the package having the package identifier includes the element 131 having the element ID 133. The third element indicates that the package having the package identifier includes the element 151 having the element ID 153. The second element and the third element together indicate that the element 131 is linked to the element 151 by indicating that the element 131 and the element 151 are included in the same package (e.g., the package having the package identifier).

The first device 102 may provide the first file 111 and the package file 115 to one or more devices. For example, the first device 102 may provide the first file 111 and the package file 115 to the third device 106. The file analyzer 150 of the third device 106 may generate the GUI 117 based on the first file 111 and the package file 115. The GUI 117 may indicate the linkage between one or more of the elements 130 of the first file 111, as further described with reference to FIGS. 4, 6, and 9. The GUI 117 may include at least one option that is selectable to initiate perform of an aggregate operation based on the elements 130. For example, a user 105 may select one or more options of the GUI 117. The file analyzer 150 may be configured to perform the one or more aggregate operations in response to receiving user input 163 indicating the selection of the one or more options, as further described with reference to FIGS. 4, 6, and 9. In a particular aspect, the first device 102 provides the first file 111 and the package file 115 to a fourth device (not shown in FIG. 1). The fourth device is not configured to process package files, such as the package file 115. For example, the fourth device includes a second file analyzer (e.g., a legacy file analyzer) that is not configured to process the package file 115. The second file analyzer may generate a GUI based on the first file 111 (and not the package file 115). The GUI may indicate attribute values of the elements 130 without indicating linkage between any of the elements 130.

The system 100 may thus enable the third device 106 to generate the GUI 117 indicating linkage between multiple elements of the first file 111. The package file 115 may have a smaller memory footprint than the first file 111 because the package file 115 includes linkage information between elements of the first file 111 without duplicating all the content of the first file 111. The first device 102 may send the first file 111 and the package file 115 without a prior determination whether a recipient device corresponds to a legacy device or a non-legacy device. Legacy devices ignore/discard the package file 115. Sending the first file 111 and the package file 115 conserves resources (e.g., bandwidth, memory, or both) while maintaining backward compatibility, as compared to sending the first file 111 (in case of a legacy device) and a second file (in case of a non-legacy device) that duplicates all of the information of the first file 111 and includes linkage information.

Figure 2:
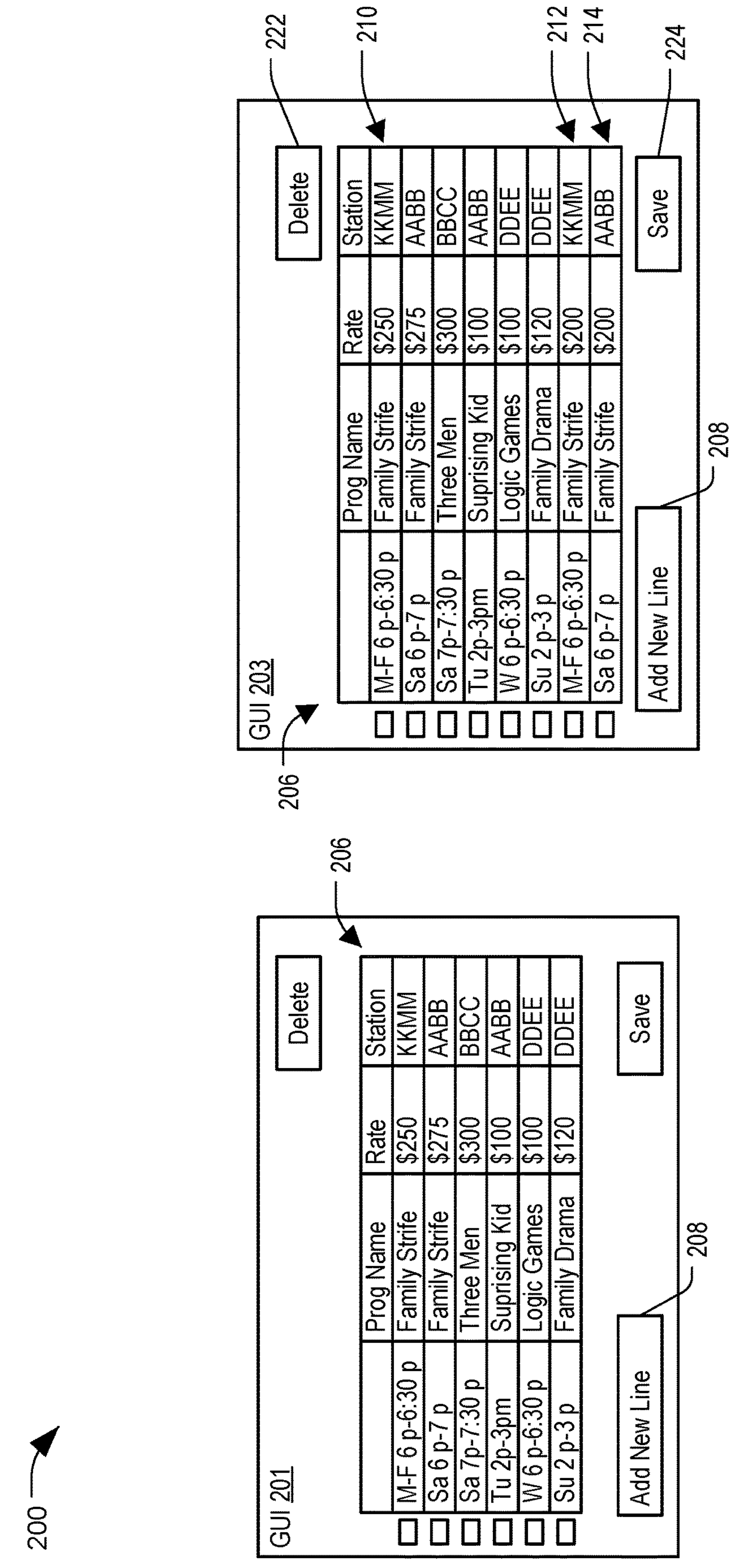
FIG. 2 is a diagram to illustrate aspects of graphical user interfaces generated by the system of FIG. 1.

Referring to FIG. 2, a diagram is shown and generally designated 200. The diagram 200 includes a GUI 201 and a GUI 203. The GUI 201, the GUI 203, or both, may be generated by at least one of the package file generator 120, the first device 102, or the system 100 of FIG. 1. For example, the GUI 173 of FIG. 1 may include the GUI 201, the GUI 203, or both.

The GUI 201 includes a table 206 including one or more rows and one or more rows. The GUI 201 includes an add new line option 208. The add new line option 208 is selectable to add a line to the table 206. For example, the package file generator 120 of FIG. 1 may, in response to receiving the user input 113 indicating a selection of the add new line option 208, add an element to the elements 130 and generate the GUI 203 based on the updated version of the elements 130. The GUI 203 corresponds to an updated version of the GUI 201 with two additional lines (or rows) in the table 206.

Each of the rows of the table 206 corresponds to a particular element of the elements 130 of FIG. 1. Each of the columns corresponds to an attribute of the elements 130. For example, the table 206 includes a row 210, a row 212, and a row 214. The row 210 includes a first value (e.g., "M-F 6 p-6:30 p") for a first column, a second value (e.g., "Family Strife") for a second column, a third value (e.g., $250) for a third column, and a fourth value (e.g., "KKMM") for a fourth column.

The row 210 may correspond to a particular element of the elements 130. The first column, the second column, the third column, and the fourth column may correspond to a first attribute, a second attribute, a third attribute, and a fourth attribute, respectively of the elements 130. The first value of the first column may indicate that the particular element has the first value (e.g., a first attribute value) for the first attribute. In a particular aspect, the fourth column corresponds to the attribute 134 of FIG. 1 and the fourth value (e.g., "KKMM") corresponds to the attribute value 135 (e.g., a first station ID).

The row 212 and the row 214 may correspond to the element 131 and the element 151 of FIG. 1, respectively. The table 206 may be editable. For example, the user input 113 of FIG. 1 may indicate that the row 212 includes the first value (e.g., "M-F 6 p-6:30 p") for the first column, the second value (e.g., "Family Strife") for the second column, a fifth value (e.g., $200) for the third column, and the fourth value (e.g., "KKMM") for the fourth column. In a particular aspect, the user 103 may add the rows 212 and 214 to indicate updated values (e.g., discounted values) for the third column with the intention of adding the rows 212 and 214 to a package, as further described with reference to FIG. 3. For example, the user 103 may copy the column values of the row 210 as the column values for the row 212 and may enter an updated value (e.g., the fifth value) for the third column.

Each of the GUI 201 and the GUI 203 includes a save option 224. The user input 113 may indicate a selection of the save option 224. The package file generator 120 may, in response to receiving the user input 113, update attribute values of the elements 130 based on corresponding column values indicated in the user input 113. For example, the package file generator 120 may update the element 131 to have the attribute value 135 (e.g., the first station ID) for the attribute 134 in response to determining that the row 212 corresponds to the element 131, that the fourth column corresponds to the attribute 134, that the row 212 has the fourth value (e.g., "KKMM") for the fourth column, and that the attribute value 135 (e.g., the first station ID) of the attribute 134 corresponds to the fourth value (e.g., "KKMM"). As another example, the package file generator 120 may update the element 151 to have the attribute value 155 (e.g., a second station ID) for the attribute 134 in response to determining that the row 214 corresponds to the element 151, that the fourth column corresponds to the attribute 134, that the row 214 has a sixth value (e.g., "AABB") for the fourth column, and that the attribute value 155 (e.g., the second station ID) of the attribute 134 corresponds to the sixth value (e.g., "AABB").

Each of the GUI 201 and the GUI 203 may include a plurality of checkboxes and a delete option 222. Each of the checkboxes may correspond to a particular row of the rows. In a particular aspect, the user input 113 indicates a selection of a checkbox corresponding to the row 214 and a selection of the delete option 222. In this aspect, the package file generator 120 may, in response to receiving the user input 113, remove the element 151 from the elements 130.

The GUI 201 and the GUI 203 thus enable updating of the first file 111 while maintaining compliance with the particular format (e.g., the industry standard format). For example, the user 103 may use the GUI 201 and the GUI 203 to add one or more elements to the elements 130, remove one or more elements from the elements 130, or both.

Figure 3:
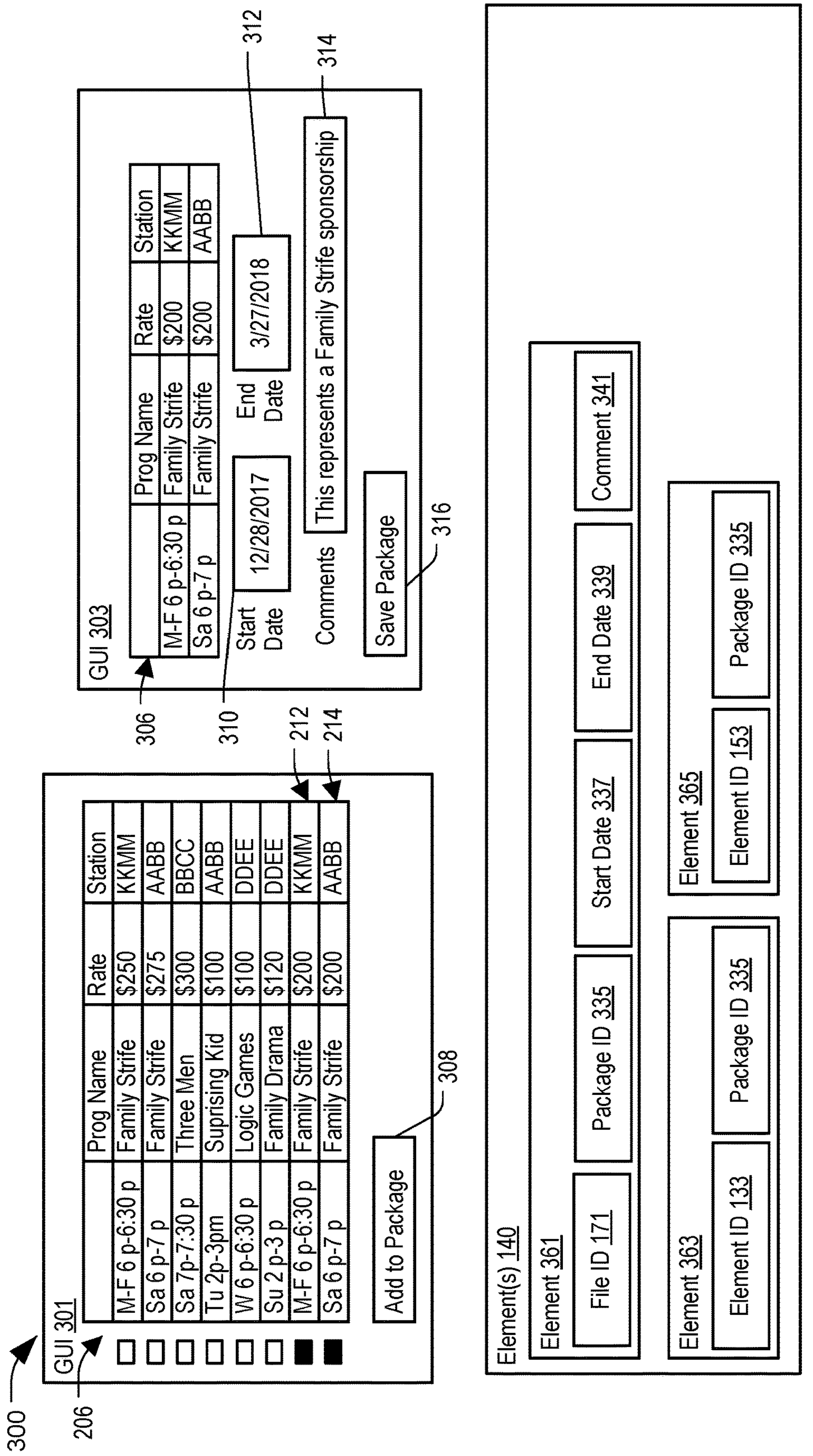
FIG. 3 is a diagram to illustrate aspects of graphical user interfaces generated by the system of FIG. 1.

Referring to FIG. 3, a diagram is shown and generally designated 300. The diagram 300 includes a GUI 301, a GUI 303, and the elements 140. The GUI 301, the GUI 303, or both, may be generated by at least one of the package file generator 120, the first device 102, or the system 100 of FIG. 1. For example, the GUI 173 of FIG. 1 may include the GUI 301, the GUI 303, or both.

The GUI 301 includes the table 206 and an add to package option 308. The user 103 of FIG. 1 may select one or more of the rows of the table 206 and may select the add to package option 308. The package file generator 120 may generate the GUI 303 in response to receiving the user input 113 indicating a selection of the one or more rows and the add to package option 308. For example, the package file generator 120 may generate the GUI 303 in response to receiving the user input 113 indicating a selection of a first checkbox corresponding to the row 212, a second checkbox corresponding to the row 214, and the add to package option 308.

The package file generator 120 generates the GUI 303 to include a table 306 having the selected rows. For example, the table 306 includes the row 212 and the row 214. The GUI 303 may also include a start date field 310, an end date field 312, a comments field 314, or a combination thereof. The user 103 of FIG. 1 may edit the start date field 310, the end date field 312, the comments field 314, or a combination thereof. The GUI 303 includes a save package option 316.

The package file generator 120 updates the elements 140 in response to receiving a selection of the save package option 316. For example, the package file generator 120 generates an element 361 including the file ID 171, a package ID 335, a start date 337, an end date 339, a comment 341, or a combination thereof. The package file generator 120 generates the package ID 335 as a unique package identifier of the package file 115 of FIG. 1. The package ID 335 may indicate a particular type of package (e.g., an individual element package).

The package file generator 120 may generate the start date 337 based on a first value (e.g., “12/28/2017”) of the start date field 310, the end date 339 based on a second value (e.g., “3/27/2018”) of the end date field 312, the comment 341 based on a third value (e.g., “This represents a Family Strife sponsorship”) of the comments field 314, or a combination thereof. The package file generator 120 adds the element 361 to the elements 140. The element 361 indicates that a package having the package ID 335 is associated with the first file 111 having the file ID 171. The element 361 may indicate that the package is available at or subsequent to the start date 337, at or prior to the end date 339, or both. The element 361 may indicate additional information in the comment 341 is associated with the package.

The package file generator 120 may generate one or more elements corresponding to the selected rows in response to receiving the selection of the save package option 316. For example, the package file generator 120 generates an element 363 corresponding to the row 212 and an element 365 corresponding to the row 214. The element 363 includes the element ID 133 of the element 131 corresponding to the row 212. The element 365 includes the element ID 153 of the element 151 corresponding to the row 214. Each of the element 363 and the element 365 includes the package ID 335. The element 363 indicates that the package having the package ID 335 includes the element 131 having the element ID 133. The element 365 indicates that the package having the package ID 335 includes the element 151 having the element ID 153. The elements 361, 363, and 365 of the package file 115 thus indicate a linkage between the element 131 and the element 151 of the first file 111. For example, the elements 361, 363, and 365 indicate that a package includes the element 131 and the element 151 of the first file 111. The diagram 300 thus illustrates generation (or update) of the package file 115 to indicate linkage between multiple elements of the first file 111.

Figure 4:
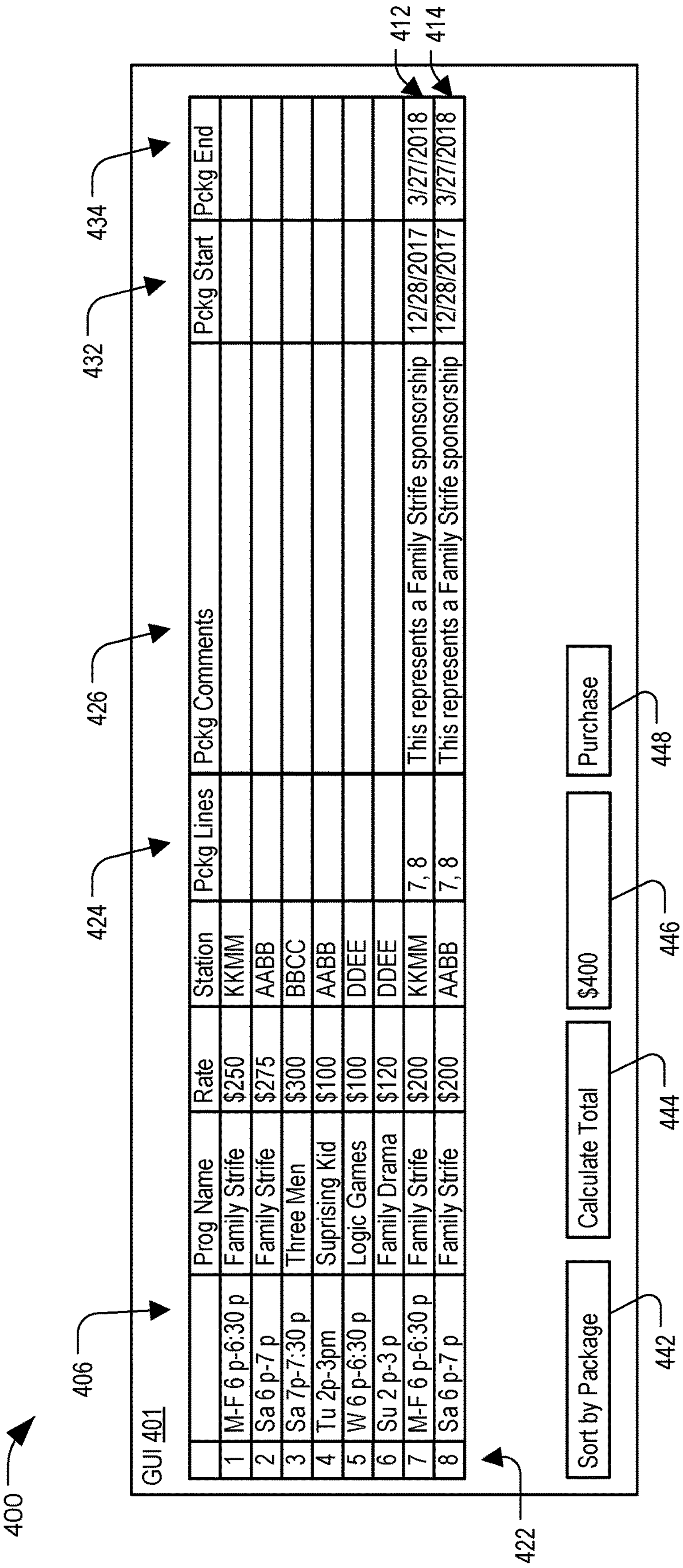
FIG. 4 is a diagram to illustrate an aspect of a graphical user interface generated by the system of FIG. 1.

Referring to FIG. 4, a diagram is shown and generally designated 400. The diagram 400 includes a GUI 401. The GUI 401 may be generated by the file analyzer 150, the third device 106, the system 100 of FIG. 1, or a combination thereof. The GUI 117 of FIG. 1 may include the GUI 401.

The file analyzer 150 may generate the GUI 401 in response to receiving the first file 111 and the package file 115. The file analyzer 150 may generate the GUI 401 to include a table 406. The file analyzer 150 may generate the table 406 to include first rows and first columns corresponding to the rows and columns of the table 206 of FIG. 2. For example, the table 406 includes a row 412 and a row 414 corresponding to the row 212 and the row 214 of the table 206 of FIG. 2, respectively. To illustrate, the row 412 and the row 414 correspond to the element 131 and the element 151 of FIG. 1, respectively.

The table 406 differs from the table 206 in that the table 406 includes a line number column 422, a package (pckg) lines column 424, a pckg comments column 426, a pckg start column 432, and a pckg end column 434. It should be understood that the table 406 is provided as an illustrative example. In some implementations, the table 406 may include fewer than 9 columns, more than 9 columns, one or more other columns, or a combination thereof. The line number column 422 may include a line identifier associated with each row. For example, the line number column 422 includes a first line identifier (e.g., 7) and a second line identifier (e.g., 8) associated with the row 412 and the row 414, respectively. The GUI 401 also includes a sort by package option 442, a calculate total option 444, a total field 446, a purchase option 448, or a combination thereof.

The file analyzer 150 may determine that the elements 140 of the package file 115 include the element 361. The file analyzer 150 may, in response to determining that the element 361 includes the file ID 171 and the package ID 335, determine that a package corresponding to the package ID 335 is associated with the first file 111 having the file ID 171.

The file analyzer 150 may determine that a package includes one or more of the elements 130. For example, the file analyzer 150 may, in response to determining that the element 363 indicates the package ID 335 and the element ID 133 and that the first file 111 includes the element 131 having the element ID 133, determine that the package having the package ID 335 includes the element 131. Similarly, the file analyzer 150 may, in response to determining that the element 365 indicates the package ID 335 and the element ID 153 and that the first file 111 includes the element 151 having the element ID 153, determine that the package having the package ID 335 includes the element 151.

The file analyzer 150 may generate an indication of linkage between the elements of the first file 111. For example, the file analyzer 150 may generate a package lines value indicating line identifiers of rows corresponding to elements that are included in the same package. To illustrate, the file analyzer 150 may, in response to determining that the package having the package ID 335 includes the element 131, generate a package lines value (e.g., "7") indicating the first line identifier (e.g., "7") of the row 412 corresponding to the element 131. The file analyzer 150 may, in response to determining that the package having the package ID 335 includes the element 151, generate (or update) the package lines value (e.g., "7, 8") to indicate the second line identifier (e.g., "8") of the row 414 corresponding to the element 151. The package lines value (e.g., "7, 8") indicates that the row 412 corresponding to the first line identifier (e.g., "7") is linked to the row 414 corresponding to the second line identifier (e.g., "8"). For example, the package lines value (e.g., "7, 8") indicates that a package includes the element 131 corresponding to the row 412 and the element 151 corresponding to the row 414.

The file analyzer 150 may add the indication of the linkage between the elements of the first file 111 to entries in the pckg lines column 424 that are associated with the rows corresponding to the elements. For example, the file analyzer 150 may, in response to determining that the package includes the element 131 and that the row 412 corresponds to the element 131, add the package lines value (e.g., "7,8") to a first entry of the pckg lines column 424 associated with the row 412. Similarly, the file analyzer 150 may, in response to determining that the package includes the element 151 and that the row 414 corresponds to the element 151, add the package lines value (e.g., "7,8") to a second entry of the pckg lines column 424 associated with the row 414.

In a particular aspect, the element 361 includes the comment 341 associated with the package having the package ID 335. In this aspect, the file analyzer 150 may generate a comment value (e.g., "This represents a Family Strife sponsorship") based on the comment 341. The file analyzer 150 may add the comment value to entries of the pckg comments column 426 that are associated with the rows corresponding to the elements that are included in the package. For example, the file analyzer 150 may add the comment value (e.g., "This represents a Family Strife sponsorship") to a first entry of the pckg comments column 426 that corresponds to the row 412, to a second entry of the pckg comments column 426 that corresponds to the row 414, or both.

In a particular aspect, the element 361 includes the start date 337 associated with the package having the package ID 335. In this aspect, the file analyzer 150 may generate a start value (e.g., "12/28/2017") representative of the start date 337. The file analyzer 150 may add the start value to entries of the pckg start column 432 that are associated with the rows corresponding to the elements that are included in the package. For example, the file analyzer 150 may add the start value (e.g., "12/28/2017") to a first entry of the pckg start column 432 that corresponds to the row 412, to a second entry of the pckg start column 432 that corresponds to the row 414, or both.

In a particular aspect, the element 361 includes the end date 339 associated with the package having the package ID 335. In this aspect, the file analyzer 150 may generate an end value (e.g., "3/27/2018") representative of the end date 339. The file analyzer 150 may add the end value to entries of the pckg end column 434 that are associated with the rows corresponding to the elements that are included in the package. For example, the file analyzer 150 may add the end value (e.g., "3/27/2018") to a first entry of the pckg end column 434 that corresponds to the row 412, to a second entry of the pckg end column 434 that corresponds to the row 414, or both.

In a particular aspect, the GUI 401 includes at least one option that is selectable to initiate performance of an aggregate operation. For example, a first aggregate operation includes displaying rows of a package contiguously. The user 105 of FIG. 1 may select the sort by package option 442. The file analyzer 150 may, in response to receiving a selection of the sort by package option 442, identify rows of the table 406 that correspond to the same package and update the GUI 401 to display the identified rows contiguously. For example, the file analyzer 150 may, in response to receiving the selection of the sort by package option 442, determine that the row 412 and the row 414 correspond to the package having the package ID 335 and may update the GUI 401 to display the row 412 and the row 414 contiguously. In a particular aspect, the file analyzer 150 may update the first line identifier associated with the row 412 based on an updated position of the row 412 in the table 406, and update the second line identifier associated with the row 414 based on an updated position of the row 414 in the table 406. In this aspect, the file analyzer 150 may update the first entry of the pckg lines column 424 corresponding to the row 412, the second entry of the pckg lines column 424 corresponding to the row 414, or both, to indicate the updated first line identifier, the updated second line identifier, or both.

A second aggregate operation includes calculating a value based on attribute values of rows of a package in response to a selection of at least one of the rows. For example, the user 105 may select one or more rows of the table 406 and may select the calculate total option 444. The file analyzer 150 may, in response to receiving a selection of the calculate total option 444 and a selection of one or more rows of the table 406, determine that elements corresponding to the one or more rows are selected and generate a total rate corresponding to the selected elements. In a particular aspect, a selection of a row that is included in a package causes a selection of all rows that are included in the package. For example, the file analyzer 150 may, in response to receiving a selection of the calculate total option 444 and a selection of the row 412, the row 414, or both, determine that elements of the package having the package ID 335 are selected.

The file analyzer 150 may generate a total value based on one or more attributes of the selected elements. For example, the file analyzer 150 may generate a total value based on a first attribute value of the element 131 and a second attribute value of the element 151 (e.g., total value=first attribute value+second attribute value). In a particular aspect, the attribute 134 corresponds to rate, the element 131 includes the attribute value 135 of the attribute 134 indicating a first rate, and the element 151 includes the attribute value 155 of the attribute 134 indicating a second rate. The file analyzer 150 may update the total field 446 to indicate a total rate (e.g., a sum of the first rate and the second rate).

A third aggregate operation includes generating a purchase order based on elements of a package in response to a selection of at least one of rows corresponding to the elements. For example, the user 105 may select one or more rows of the table 406 and may select the purchase option 448. The file analyzer 150 may, in response to receiving a selection of the purchase option 448 and a selection of one or more rows of the table 406, generate a purchase order corresponding to the selected rows. A selection of a row that is included in a package may cause a selection of all rows that are included in the package. For example, the file analyzer 150 may generate a purchase order in response to receiving a selection of the purchase option 448 and a selection of the row 412, the row 414, or both. The purchase order may indicate that a first inventory item corresponding to the element 131 and a second inventory item corresponding to the element 151 is to be purchased. The third device 106 may send the purchase order to the first device 102.

The GUI 401 thus enables display of an indication of linkage between multiple elements of the first file 111. For example, the first entry of the pckg lines column 424, the second entry of the pckg lines column 424, or both, indicate that the row 412 corresponding to the element 131 of the first file 111 is linked to the row 414 corresponding to the element 151 of the first file 111. To illustrate, the first entry, the second entry, or both, indicate that the element 131 is included in the same package as the element 151.

Figure 5:
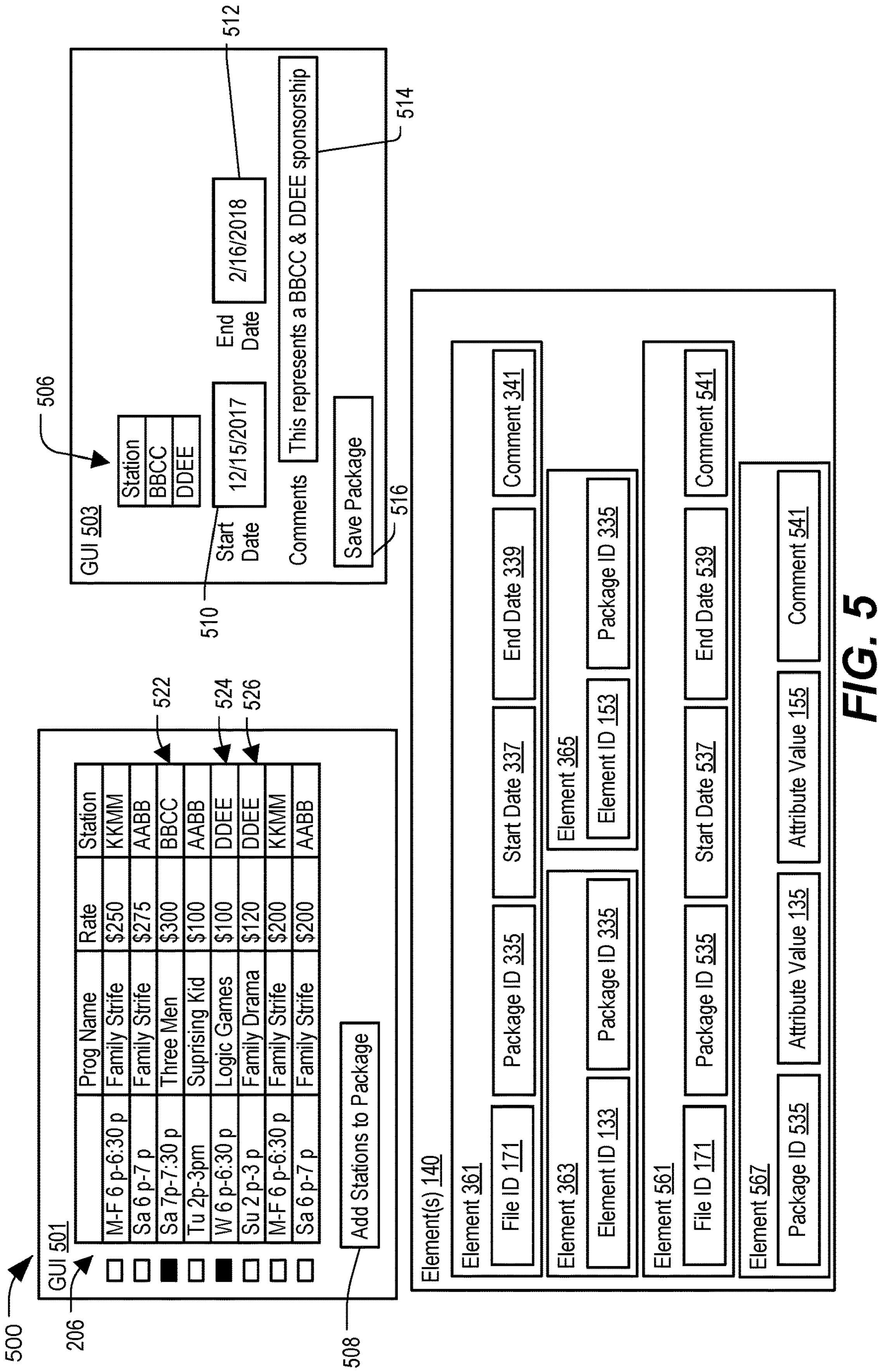
FIG. 5 is a diagram to illustrate aspects of graphical user interfaces generated by the system of FIG. 1.

Referring to FIG. 5, a diagram is shown and generally designated 500. The diagram 500 includes a GUI 501, a GUI 503, and the elements 140. The GUI 501, the GUI 503, or both, may be generated by at least one of the package file generator 120, the first device 102, or the system 100 of FIG. 1. For example, the GUI 173 of FIG. 1 may include the GUI 501, the GUI 503, or both.

The GUI 501 includes the table 206 and an add stations to package option 508. The user 103 of FIG. 1 may select one or more of the rows of the table 206 and the add stations to package option 508. The package file generator 120 may generate the GUI 503 in response to receiving the user input 113 indicating a selection of the one or more rows and the add stations to package option 508. For example, the package file generator 120 may generate the GUI 503 in response to receiving the user input 113 indicating a selection of a first checkbox corresponding to a row 522 of the table 206, a second checkbox corresponding to a row 524 of the table 206, and the add stations to package option 508.

The package file generator 120 generates the GUI 503 to include a table 506. The table 506 may indicate an attribute value of the selected rows. For example, the selected rows include the row 522 and the row 524. The row 522 corresponds to a first element of the elements 130 and the row 524 corresponds to a second element of the elements 130. For example, the row 522 corresponds to the element 131 and the row 524 corresponds to the element 151. In this example, the attribute 134 corresponds to station, the attribute value 135 indicates a first station (e.g., “BBCC”) associated with the element 131, and the attribute value 155 (e.g., “DDEE”) indicates a second station associated with the element 151. The table 506 includes a stations column associated with the attribute 134. Entries of the stations column may represent unique attribute values of the attribute 134 of the selected rows. For example, the package file generator 120 may generate the table 506 to have a first value in a first entry of stations column and a second value in a second entry of the stations column. The first value and the second value represent the first station and the second station, respectively.

The GUI 503 may also include a start date field 510, an end date field 512, a comments field 514, or a combination thereof. The user 103 of FIG. 1 may edit the start date field 510, the end date field 512, the comments field 514, or a combination thereof. The GUI 303 includes a save package option 516.

The package file generator 120 updates the elements 140 in response to receiving a selection of the save package option 516. For example, the package file generator 120 generates an element 561 including the file ID 171, a package ID 535, a start date 537, an end date 539, a comment 541, or a combination thereof. The package file generator 120 generates the package ID 535 (e.g., a group station package ID) as a unique package identifier of the package file 115 of FIG. 1. For example, the package ID 535 is distinct from the package ID 335. The package ID 535 may indicate a particular type of package (e.g., a group station package).

The package file generator 120 may generate the start date 537 based on a first value (e.g., “12/15/2017”) of the start date field 510, the end date 539 based on a second value (e.g., “2/16/2018”) of the end date field 512, the comment 541 based on a third value (e.g., “This represents a BBCC & DDEE sponsorship”) of the comments field 514, or a combination thereof. The package file generator 120 adds the element 561 to the elements 140.

The package file generator 120 generates an element 567 including the package ID 535, the attribute value 135 indicating the first station (e.g., BBCC), the attribute value 155 indicating the second station (e.g., DDEE), the comment 541, or a combination thereof. It should be understood that a particular number of elements with particular components are described as illustrative examples. In some implementations, the package file generator 120 may generate a single element or more than 2 elements in response to receiving the selection of the save package option 516. For example, the single element may correspond to a combination of the element 561 and the element 567.

The elements 561 and 567 of the package file 115 thus indicate a linkage between elements of the first file 111 that have the attribute value 135 (e.g., “BBCC”) or the attribute value 155 (e.g., “DDEE”) for the attribute 134 (e.g., station). For example, the elements 561 and 567 indicate that a package includes the element 131 corresponding to the row 522, the element 151 corresponding to the row 524, and an element of the first file 111 corresponding to a row 526 of the table 206. The diagram 500 thus illustrates generation (or update) of the package file 115 to indicate linkage between multiple elements of the first file 111.

Figure 6:
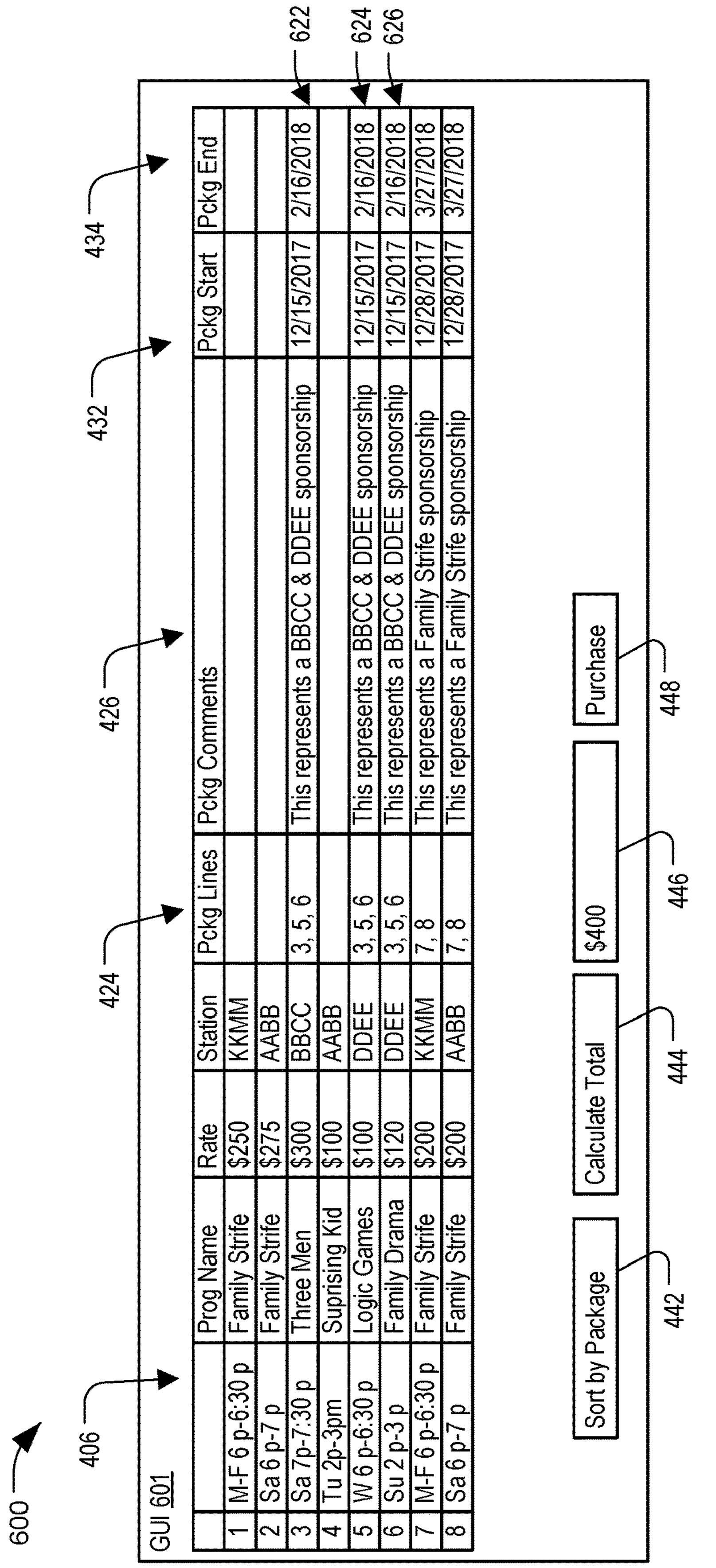
FIG. 6 is a diagram to illustrate an aspect of a graphical user interface generated by the system of FIG. 1.

Referring to FIG. 6, a diagram is shown and generally designated 600. The diagram 600 includes a GUI 601. The GUI 601 may be generated by the file analyzer 150, the third device 106, the system 100 of FIG. 1, or a combination thereof. The GUI 117 of FIG. 1 may include the GUI 601.

The file analyzer 150 may generate the GUI 601 in response to receiving the first file 111 and the package file 115. The file analyzer 150 may generate the GUI 601 to include the table 406, as described with reference to FIG. 4. For example, the table 406 includes a row 622, a row 624, and a row 626 corresponding to the row 522, the row 524, and the row 526 of FIG. 5, respectively. The file analyzer 150 may, in response to determining that the element 561 includes the file ID 171 and the package ID 535, determine that a package corresponding to the package ID 535 is associated with the first file 111 having the file ID 171.

The file analyzer 150 may determine that the package having the package ID 535 includes one or more of the elements 130. For example, the file analyzer 150 may, in response to determining that the element 567 indicates the package ID 535, the attribute value 135 of the attribute 134, and the attribute value 155 of the attribute 134, determine that the package includes one or more first elements of the elements 130 and one or more second elements of the elements 130, where each of the first elements has the attribute value 135 of the attribute 134 and each of the second elements has the attribute value 155 of the attribute 134. For example, the file analyzer 150 may, in response to determining that the element 131 has the attribute value 135 (e.g., “BBCC”) for the attribute 134, determine that the package includes the element 131 of the first file 111. The file analyzer 150 may determine that the package includes the element 151 in response to determining that the element 151 has the attribute value 155 (e.g., "DDEE") for the attribute 134. The file analyzer 150 may determine that the package includes a third element of the first file 111 in response to determining that the third element has the attribute value 155 (e.g., "DDEE") for the attribute 134. Each of the row 526 of FIG. 5 and the row 626 may correspond to the third element of the first file 111.

The file analyzer 150 may generate an indication of linkage between the elements of the first file 111. For example, the file analyzer 150 may generate a package lines value indicating line identifiers of rows corresponding to elements that are included in the same package. To illustrate, the file analyzer 150 may, in response to determining that the package having the package ID 535 includes the element 131, the element 151, and the third element, generate a package lines value (e.g., "3, 5, 6") indicating a first line identifier (e.g., "3"), a second line identifier (e.g., "5"), and a third line identifier (e.g., "6"). The first line identifier (e.g., "3"), the second line identifier (e.g., "5"), and the third line identifier (e.g., "6") may designate the row 622 corresponding to the element 131, the row 624 corresponding to the element 151, and the row 626 corresponding to the third element, respectively.

The package lines value (e.g., "3, 5, 6") indicates that the row 622 corresponding to the first line identifier (e.g., "3") is linked to the row 624 corresponding to the second line identifier (e.g., "5") and to the row 626 corresponding to the third line identifier (e.g., "6"). For example, the package lines value (e.g., "3, 5, 6") indicates that a package includes the element 131 corresponding to the row 622, the element 151 corresponding to the row 624, and a third element corresponding to the row 626.

The file analyzer 150 may add the package lines value (e.g., "3, 5, 6") to a first entry of the pckg lines column 424 associated with the row 622, a second entry of the pckg lines column 424 associated with the row 624, a third entry of the pckg lines column 424 associated with the row 626.

In a particular aspect, the file analyzer 150 updates, based on the comment 541, entries of the pckg comments column 426 corresponding to the row 622, the row 624, the row 626, or a combination thereof, as described with reference to FIG. 4. In a particular aspect, the file analyzer 150 updates, based on the start date 537, entries of the pckg start column 432 corresponding to the row 622, the row 624, the row 626, or a combination thereof, as described with reference to FIG. 4. In a particular aspect, the file analyzer 150 updates, based on the end date 539, entries of the pckg end column 434 corresponding to the row 622, the row 624, the row 626, or a combination thereof, as described with reference to FIG. 4.

The GUI 601 thus enables display of an indication of linkage between multiple elements of the first file 111. For example, the first entry of the pckg lines column 424, the second entry of the pckg lines column 424, the third entry of the pckg lines column 424, or a combination thereof, indicate that the row 622 corresponding to the element 131 of the first file 111 is linked to the row 624 corresponding to the element 151 of the first file 111 and to the row 626 corresponding to a third element of the first file 111. To illustrate, the first entry, the second entry, the third entry, or a combination thereof, indicate that the element 131 is included in the same package as the element 151 and the third element.

Figure 7:
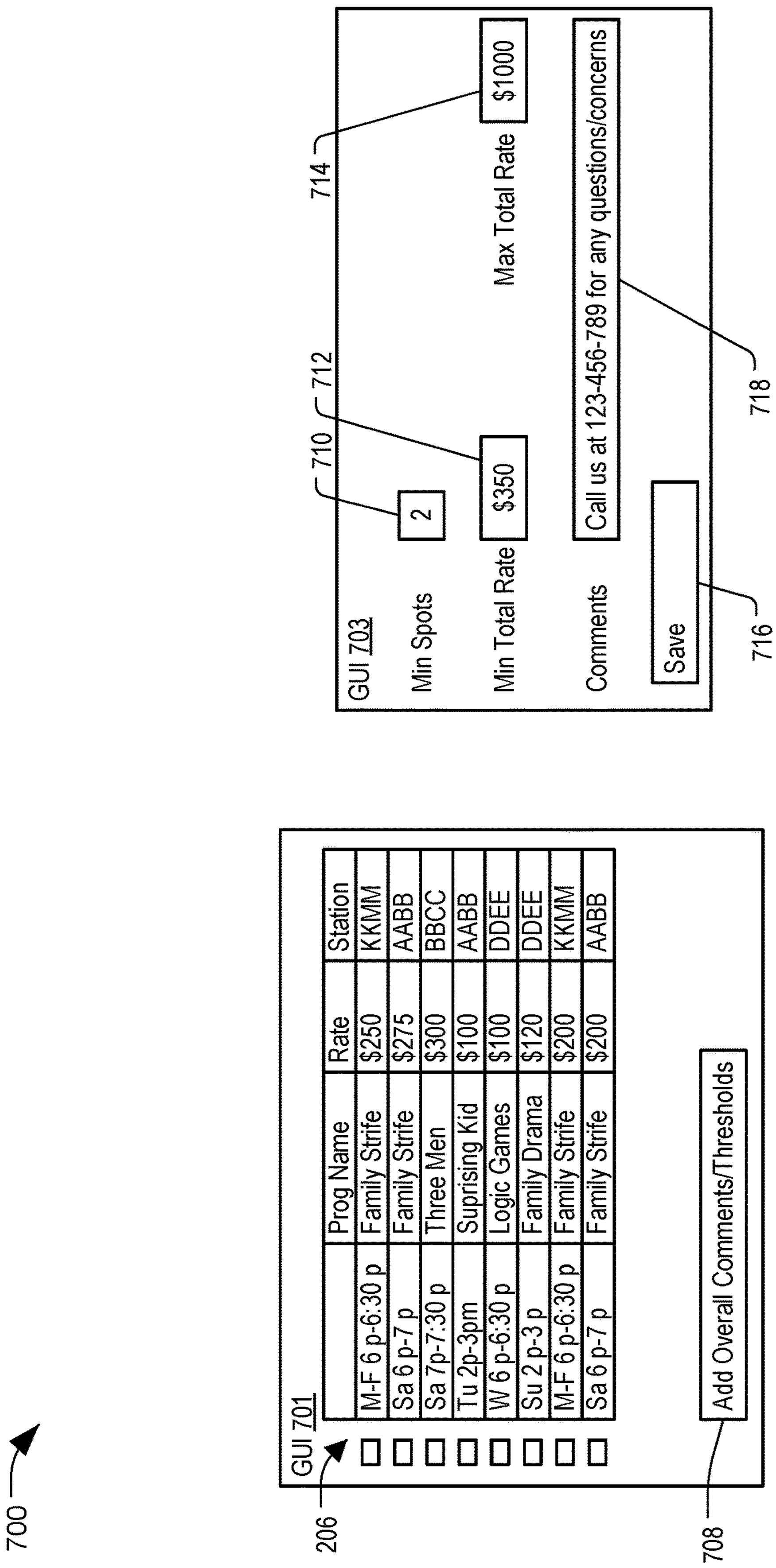
FIG. 7 is a diagram to illustrate aspects of graphical user interfaces generated by the system of FIG. 1.

Referring to FIG. 7, a diagram is shown and generally designated 700. The diagram 700 includes a GUI 701 and a GUI 703. The GUI 701, the GUI 703, or both, may be generated by at least one of the package file generator 120, the first device 102, or the system 100 of FIG. 1. For example, the GUI 173 of FIG. 1 may include the GUI 701, the GUI 703, or both.

The GUI 701 includes the table 206 and an add overall comments/thresholds option 708. The user 103 of FIG. 1 may select the add overall comments/thresholds option 708. The package file generator 120 may generate the GUI 703 in response to receiving a selection of the add overall comments/thresholds option 708. The GUI 703 includes a min spots field 710, a min total rate field 712, a max total rate field 714, an overall comments field 718, and a save option 716.

The user 103 of FIG. 1 may enter values in one or more of the min spots field 710, the min total rate field 712, the max total rate field 714, the overall comments field 718, or a combination thereof. The user 103 may also select the save option 716. The package file generator 120 may add one or more elements to the elements 140 of the package file 115 in response to receiving a selection of the save option 716 and the user input 113 indicating values of the min spots field 710, the min total rate field 712, the max total rate field 714, the overall comments field 718, or a combination thereof, as further described with reference to FIG. 8.

Figure 8:
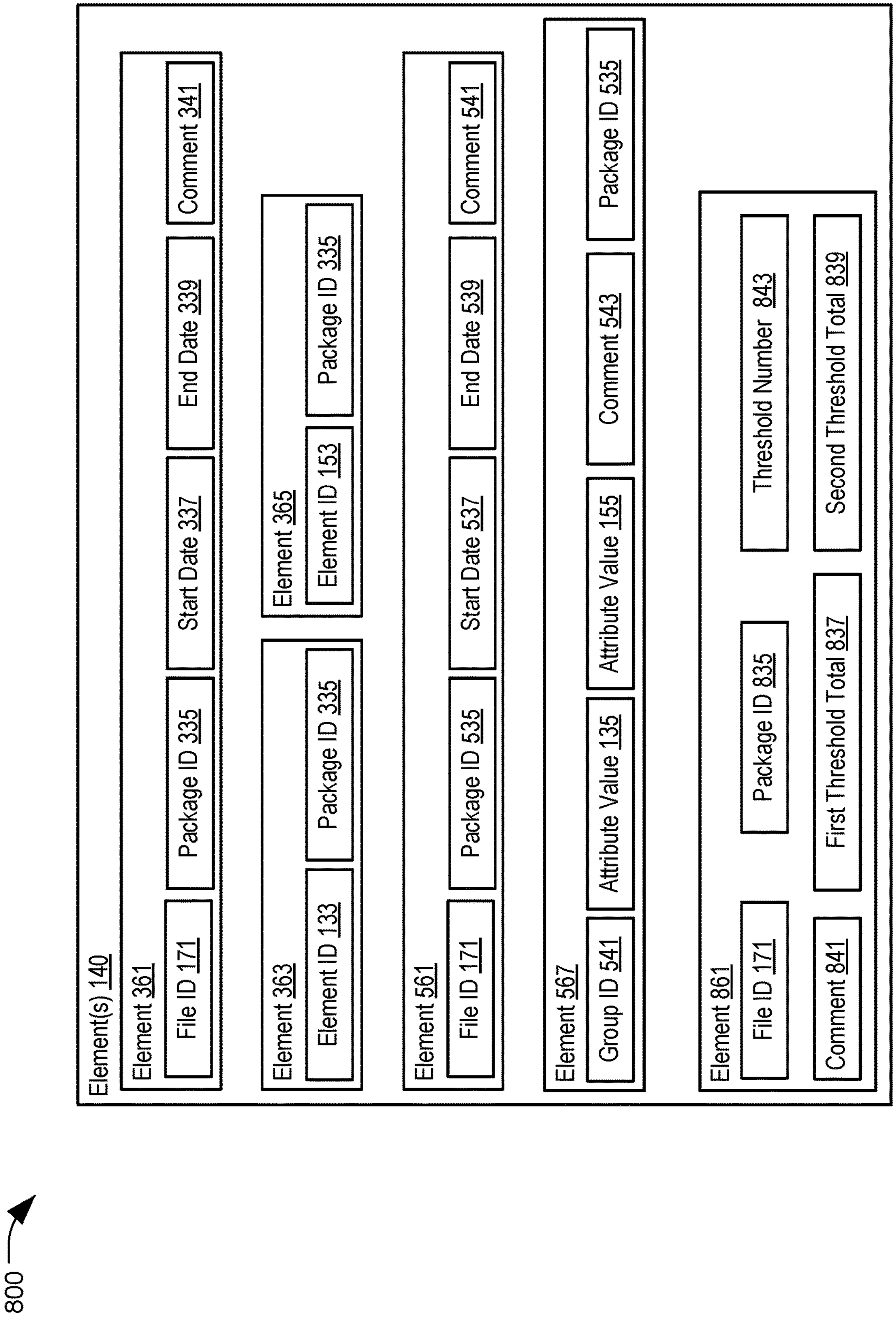
FIG. 8 is a diagram to illustrate an aspect of a package file generated by the system of FIG. 1.

Referring to FIG. 8, a diagram is shown and generally designated 800. The diagram 800 includes the elements 140. The package file generator 120 may, in response to receiving a selection of the save option 716 of FIG. 7, add one or more elements to the elements 140 of the package file 115 based on the user input 113 of FIG. 1. For example, the package file generator 120 may add an element 861 to the elements 140 based on the user input 113. To illustrate, the package file generator 120 may generate the element 861 to include the file ID 171, a package ID 835, a threshold number 843, a first threshold total 837, a second threshold total 839, a comment 841, or a combination thereof.

The package file generator 120 may generate the package ID 835 as a unique package identifier of the package file 115. For example, the package ID 835 is distinct from each of the package ID 335 and the package ID 535. The package ID 835 may indicate a particular type of package (e.g., an overall package).

The package file generator 120 may, in response to determining that the user input 113 indicates a first value for the min spots field 710 of FIG. 7, set the threshold number 843 to the first value (e.g., 2). The first value may indicate a threshold number of elements and the threshold number 843 may indicate that the threshold number of elements is to be included in the package associated with the package ID 835.

The package file generator 120 may, in response to determining that the user input 113 indicates a second value (e.g., "$350") for the min total rate field 712 of FIG. 7, set the first threshold total 837 to the second value (e.g., 350). In a particular aspect, the attribute 134 (e.g., rate) is associated with the min total rate field 712. In this aspect, the first threshold total 837 indicates a minimum threshold (e.g., a minimum total rate threshold) for a sum of attribute values of the attribute 134 (e.g., rate). For example, the first threshold total 837 indicates that one or more of the elements 130 are to be selected such that a sum of attribute values of the attribute 134 (e.g., rate) for the selected elements is greater than or equal to the first threshold total 837.

The package file generator 120 may, in response to determining that the user input 113 indicates a third value (e.g., "$1000") for the max total rate field 714 of FIG. 7, set the second threshold total 839 to the third value (e.g., 1000). In a particular aspect, the attribute 134 (e.g., rate) is associated with the max total rate field 714. In this aspect, the second threshold total 839 indicates a maximum threshold (e.g., a maximum total rate threshold) for a sum of attribute values of the attribute 134 (e.g., rate). For example, the second threshold total 839 indicates that one or more of the elements 130 are to be selected such that a sum of attribute values of the attribute 134 (e.g., rate) for the selected elements is less than or equal to the second threshold total 839.

The package file generator 120 may, in response to determining that the user input 113 indicates a fourth value (e.g., "Call us at 123-456-789 for any questions/concerns") for the overall comments field 718 of FIG. 7, set the comment 841 to the fourth value (e.g., "Call us at 123-456-789 for any questions/concerns").

The element 861 indicates that a package having the package ID 835 is associated with the first file 111 having the file ID 171. The element 861 may indicate that the package associated with the package ID 835 contains or includes a threshold number of elements (e.g., a minimum number of elements, a maximum number of elements, or both) indicated by the threshold number 843. The element 861 may indicate that the first threshold total 837 is related to the attribute 134 and that the package associated with the package ID 835 includes one or more elements such that a sum of attribute values of the attribute 134 for the included elements is greater than or equal to the first threshold total 837. The element 861 may indicate that the second threshold total 839 is related to the attribute 134 and that the package associated with the package ID 835 includes one or more elements such that a sum of attribute values of the attribute 134 for the included elements is less than or equal to the second threshold total 839. The element 861 may also indicate that the package associated with the package ID 835 has/includes the comment 841.

The element 861 of the package file 115 thus indicates a linkage between multiple elements of the first file 111. For example, the element 861 indicates that a package includes at least the threshold number of elements indicated by the threshold number 843. As another example, the element 861 indicates that a package includes elements such that a corresponding total value for the attribute 134 (e.g., rate) is greater than or equal to the first threshold total 837, is less than or equal to the second threshold total 839, or both. The diagram 700 and the diagram 800 thus illustrate generation (or update) of the package file 115 to indicate linkage between multiple elements of the first file 111.

Referring to FIG. 9, a diagram is shown and generally designated 900. The diagram 900 includes a GUI 901. The GUI 901 may be generated by the file analyzer 150, the third device 106, the system 100 of FIG. 1, or a combination thereof. The GUI 117 of FIG. 1 may include the GUI 901.

The file analyzer 150 may generate the GUI 901 in response to receiving the first file 111 and the package file 115. The file analyzer 150 may generate the GUI 901 to include the table 406, as described with reference to FIGS. 4 and 6.

The file analyzer 150 may, in response to determining that the element 861 includes the file ID 171 and the package ID 835, determine that a package corresponding to the package ID 835 is associated with the first file 111 having the file ID 171.

The file analyzer 150 may, in response to determining that the element 861 includes the package ID 835 and the threshold number 843, generate text 902 indicating the threshold number 843 and include the text 902 in the GUI 901. The file analyzer 150 may, in response to determining that the element 861 includes the package ID 835 and the first threshold total 837 associated with the attribute 134, generate text 904 indicating the first threshold total 837 and include the text 904 in the GUI 901. The file analyzer 150 may, in response to determining that the element 861 includes the package ID 835 and the second threshold total 839, generate text 906 indicating the second threshold total 839 and may include the text 906 in the GUI 901. The file analyzer 150 may, in response to determining that the element 861 includes the package ID 835 and the comment 841, generate text 908 indicating the comment 841 and include the text 908 in the GUI 901.

The text 902 may indicate to the user 105 that the information (e.g., inventory information such as prices/rates) indicated by the GUI 901 is valid with a first condition that the user 105 selects rows corresponding to at least the threshold number of elements for purchase. The text 904 may indicate to the user 105 that the information is valid with a second condition that the user 105 selects rows corresponding to elements such that a sum of the values (e.g., attribute values) of the attribute 134 (e.g., the rate) for the selected rows is greater than or equal to the first threshold total 837 indicated by the text 904. The text 906 may indicate to the user 105 that the information is valid with a third condition that the sum of the values of the attribute 134 (e.g., the rate) for the selected rows is less than or equal to the second threshold total 839 indicated by the text 906. The text 908 may provide the user 105 with additional information/conditions.

In a particular aspect, the file analyzer 150 may generate a purchase order in response to receiving a selection of one or more rows of the table 406 and a selection of the purchase option 448. In a particular aspect, the file analyzer 150 generates the purchase order based on determining whether one or more conditions indicated by the element 861 are satisfied. Determining whether a condition is satisfied may correspond to performing an aggregate operation. The file analyzer 150 may determine one or more selected elements in response to receiving a selection of the purchase option 448, as described with reference to FIG. 4. As a particular example, the file analyzer 150 may determine whether a first condition is satisfied based on the selected elements and the threshold number 843. To illustrate, the file analyzer 150 determines that the first condition is satisfied in response to determining that a count of the selected elements is greater than or equal to the threshold number 843. Alternatively, the file analyzer 150 determines that the first condition is not satisfied in response to determining that the count of the selected elements is less than the threshold number 843.

As another example, the file analyzer 150 may determine whether a second condition is satisfied based on the first threshold total 837 and a sum of attribute values of the selected elements for an attribute (e.g., the attribute 134) related to the first threshold total 837. To illustrate, the file analyzer 150 determines that the second condition is satisfied in response to determining that a sum of attribute values for the attribute 134 for the selected elements is greater than or equal to the first threshold total 837. For example, the selected elements may include the element 131 and the element 151 of FIG. 1. The file analyzer 150 determines that the second condition is satisfied in response to determining that a sum of the attribute value 135 and the attribute value 155 is greater than or equal to the first threshold total 837. Alternatively, the file analyzer 150 determines that the second condition is not satisfied in response to determining that the sum of the attribute value 135 and the attribute value 155 is less than the first threshold total 837.

In a particular example, the file analyzer 150 determines whether a third condition is satisfied based on the second threshold total 839 and a sum of attribute values of the selected elements for an attribute (e.g., the attribute 134) related to the second threshold total 839. To illustrate, the file analyzer 150 determines that the third condition is satisfied in response to determining that a sum of attribute values for the attribute 134 for the selected elements is less than or equal to the second threshold total 839. For example, the selected elements may include the element 131 and the element 151 of FIG. 1. The file analyzer 150 determines that the third condition is satisfied in response to determining that a sum of the attribute value 135 and the attribute value 155 is less than or equal to the second threshold total 839. Alternatively, the file analyzer 150 determines that the third condition is not satisfied in response to determining that the sum of the attribute value 135 and the attribute value 155 is greater than or equal to the second threshold total 839.

The file analyzer 150 may generate a purchase order corresponding to the selected elements, as described with reference to FIG. 4. In a particular aspect, the file analyzer 150 generates the purchase order in response to receiving the selection of the purchase option 448 and independently of performing a validation condition analysis. For example, the file analyzer 150 may generate the purchase order independently of determining whether the selected elements satisfy conditions corresponding to the threshold number 843, the first threshold total 837, or the second threshold total 839. In an alternate aspect, the file analyzer 150 generates the purchase order in response to determining that the one or more conditions indicated by the element 861 are satisfied. For example, the file analyzer 150 may generate the purchase order based on determining that a first condition is satisfied in response to determining that a count of selected elements is greater than the threshold number 843. The file analyzer 150 may generate the purchase order based on determining that a second condition is satisfied in response to determining that a sum of attribute values of the attribute 134 for the selected elements is greater than or equal to the first threshold total 837. The file analyzer 150 may generate the purchase order based on determining that a third condition is satisfied in response to determining that the sum of attribute values is less than or equal to the second threshold total 839. The purchase order may indicate that the purchase order is associated with the first file 111, the package file 115, or both. The third device 106 may send the purchase order to the first device 102.

In a particular aspect, the package file generator 120 may, in response to receiving the purchase order from the third device 106, send a success notification to the third device 106 independently of performing a validation condition analysis of the purchase order. For example, in this aspect, the package file generator 120 may send the success notification to the third device 106 independently of determining whether the purchase order satisfies one or more conditions indicated by the package file 115 associated with the purchase order. The success notification may indicate that the purchase order is received by the package file generator 120. In an alternative aspect, the package file generator 120 may, in response to determining that the purchase order is associated with the package file 115, determine whether the selected elements indicated in the purchase order satisfy one or more conditions indicated by the package file 115. The package file generator 120 may send a success notification to the third device 106 in response to determining that the one or more conditions are satisfied by the selected elements. The success notification may indicate that the purchase order has been successfully processed. Alternatively, the package file generator 120 may send an error notification to the third device 106 in response to determining that the one or more conditions are not satisfied by the selected elements. The error notification may indicate that there is an error in processing the purchase order. The error notification may indicate whether the first condition is not satisfied, the second condition is not satisfied, the third condition is not satisfied, or a combination thereof. The file analyzer 150 may update the GUI 117 to indicate the success notification or the error notification.

The GUI 901 thus enables display of an indication of linkage between multiple elements of the first file 111. For example, the text 902 indicates that a package includes at least a threshold number of elements. As another example, the text 904 indicates that a package includes elements such that a corresponding total is greater than or equal to a first indicated threshold (e.g., $350), the text 906 indicates that the package includes elements such that the corresponding total is less than or equal to a second indicated threshold (e.g., $1000), or both. The diagram 900 thus illustrates display of an indication of linkage between multiple elements of the first file 111.

It should be understood that the first condition, the second condition, and the third condition are provided as illustrative, non-limiting examples of conditions indicated by the package file 115. In other implementations, the package file 115 may include one or more other conditions. For example, the GUI 303 of FIG. 3, the GUI 503 of FIG. 5, or both, may include a package min spots field, a package min total rate field, a package max total rate field, or a combination thereof. The package file generator 120 may add an element to the elements 140 indicating that the package corresponding to the package ID 335 (or the package ID 535) is associated with a package threshold number corresponding to a value of the package min spots field, a first package threshold total corresponding to a value of the package min total rate field, a second package threshold total corresponding to a value of the package max total rate field, or a combination thereof.

The file analyzer 150 may, in response to determining that the elements 140 include the element associated with the package ID 335 (or the package ID 535), generate text indicating the package threshold number, the first package threshold total, the second package threshold total, or a combination thereof, and include the text in the GUI 401 (or the GUI 601). The GUI 401 (or the GUI 601) may indicate package information (e.g., inventory information such as prices/rates) associated with a package corresponding to the package ID 335 (or the package ID 535). The text may indicate to the user 105 that the package information is valid with a first particular condition that the user 105 selects rows of the package corresponding to at least the package threshold number of elements for purchase. For example, the text may indicate that an element included in the package is available at a particular price if the user 105 selects elements of the packages such that a count of the selected elements of the package is greater than or equal to the package threshold number of elements.

The text may indicate to the user 105 that the package information is valid with a second particular condition that the user 105 selects rows of the package such that a sum of the values (e.g., attribute values) of the attribute 134 (e.g., the rate) for the selected rows is greater than or equal to the first package threshold total. For example, the text may indicate that an element included in the package is available at a particular price if the user 105 selects elements of the package for purchase such that a total price of the selected elements of the package is greater than or equal to the first package threshold total.

The text may indicate to the user 105 that the package information is valid with a third particular condition that the sum of the values of the attribute 134 (e.g., the rate) for the selected rows of the package is less than or equal to the second package threshold total. For example, the text may indicate that an element included in the package is available at a particular price if the user 105 selects elements of the package for purchase such that a total price of the selected elements of the package is less than or equal to the second package threshold total.

In a particular aspect, the file analyzer 150 may generate the purchase order independently of determining whether one or more conditions associated with the package are satisfied. For example, the file analyzer 150 may generate the purchase order independently of determining whether the first particular condition, the second particular condition, or the third particular condition is satisfied. In an alternate aspect, the file analyzer 150 may generate the purchase order based on determining whether one or more conditions associated with the package are satisfied. As a particular example, the file analyzer 150 may determine that a first particular condition is satisfied in response to determining that a count of the selected elements that are associated with the package ID 335 (or the package ID 535) is greater than or equal to the package threshold number. As another example, the file analyzer 150 may determine that the second particular condition is satisfied in response to determining that a sum of attribute values for the attribute 134 for the selected elements that are associated with the package ID 335 (or the package ID 535) is greater than or equal to the first package threshold total. In a particular example, the file analyzer 150 may determine that the third condition is satisfied in response to determining that a sum of attribute values for the attribute 134 for the selected elements that are associated with the package ID 335 (or the package ID 535) is less than or equal to the second package threshold total. The file analyzer 150 may generate the purchase order in response to determining that the first condition, the second condition, the third condition, or a combination thereof, is satisfied. In this aspect, the file analyzer 150 may perform validation of the conditions associated with one or more packages prior to generating the purchase order.

Referring to FIG. 10, a method of operation is shown and generally designated 1000. The method 1000 may be performed by the package file generator 120, the first device 102, the system 100 of FIG. 1, or a combination thereof.

The method 1000 includes receiving, at a first device from a second device, a first file including a plurality of elements, at 1002. For example, the first device 102 of FIG. 1 may receive the first file 111 from the second device 104, as described with reference to FIG. 1. The first file 111 includes the elements 130. The first file 111 may be represented in a markup language and may comply with an inventory availability format.

The method 1000 also includes receiving user input at the first device, at 1004. For example, the package file generator 120 of FIG. 1 may receive the user input 113, as described with reference to FIG. 1.

The method 1000 further includes generating, based on the user input, a second file that indicates linkage between multiple elements of the first file, at 1006. For example, the package file generator 120 of FIG. 1 may generate, based on the user input 113, the package file 115 that indicates linkage between multiple elements of the first file 111, as described with reference to FIG. 1.

The method 1000 also includes providing, from the first device to a third device, the first file and the second file, at 1008. For example, the first device 102 of FIG. 1 may send the first file 111 and the package file 115 to the third device 106.

The method 1000 thus enables generation of the package file 115 indicating linkage between multiple elements of the first file 111. The package file 115 may have a smaller size than the first file 111. The first device sends the first file 111 and the package file 115 without a prior determination whether a recipient device is a legacy device that is not configured to process package files (such as the package file 115) or a non-legacy device that is configured to process package files. Resource (e.g., memory, bandwidth, or both) utilization may be reduced by sending the first file 111 and the package file 115 while maintaining backward compatibility with legacy devices that are not configured to process the package file 115, as compared to sending the first file 111 (in case of a legacy device) and a second file that corresponds to a combination of the first file 111 and the package file 115 (in case of a non-legacy device).

Referring to FIG. 11, a method of operation is shown and generally designated 1100. The method 1100 may be performed by the file analyzer 150, the third device 106, the system 100 of FIG. 1, or a combination thereof.

The method 1100 includes receiving, at a device, a first file including a plurality of elements, at 1102. For example, the third device 106 of FIG. 1 may receive the first file 111 including the elements 130, as described with reference to FIG. 1. The first file 111 may be represented in a markup language and may comply with an inventory availability format.

The method 1100 also includes receiving, at the device, a second file that indicates linkage between multiple elements of the first file, at 1104. For example, the third device 106 of FIG. 1 may receive the package file 115 that indicates linkage between multiple elements of the first file 111, as described with reference to FIG. 1.

The method 1100 further includes generating, at the device, a graphical user interface (GUI) indicating the linkage between the multiple elements, at 1106. For example, the file analyzer 150 of FIG. 1 may generate the GUI 117 indicating the linkage between multiple elements of the first file 111, as described with reference to FIG. 1. The GUI 117 may include at least one option that is selectable to initiate performance of an aggregate operation on the multiple elements, as described with reference to FIGS. 4 and 9.

The method 1100 also includes providing the GUI from the device to a display, at 1108. For example, the file analyzer 150 of FIG. 1 may provide the GUI 117 to the display 108 for display to a user.

The method 1100 thus enables display of linkage between multiple elements of the first file 111. An indication of the linkage may be absent from the first file 111. The file analyzer 150 may determine the linkage based on an analysis of the first file 111 and the package file 115, and the linkage may be displayed via a GUI.

FIG. 12 is a block diagram of a computing environment 1200 including a computing device 1210 that is operable to support aspects of computer-implemented methods, computer program products, and system components according to the present disclosure.

The computing device 1210 includes at least one processor 1220 and the memory 132 (e.g., a system memory). For example, the computing device 1210 may be a mobile device, a desktop computer, a laptop computer, a tablet computer, a server, a cloud computing device, or any other fixed or mobile computing device. The at least one processor 1220 may include the package file generator 120, the file analyzer 150, or both, of FIG. 1. Depending on the configuration and type of computing device, the memory 132 may include volatile (such as random access memory or "RAM"), non-volatile (such as read-only memory or "ROM," flash memory, and similar memory devices that maintain stored data even when power is not provided), a combination thereof, or some other memory. The memory 132 may store an operating system 1232, program data 1238, or both. The program data 1238 may include the first file 111, the package file 115, or both, of FIG. 1. In an illustrative aspect, the computing device 1210 may correspond to the first device 102, the third device 106, or both, of FIG. 1.

The computing device 1210 may also have additional features or functionality. For example, the computing device 1210 may also include removable and/or non-removable additional data storage devices, such as magnetic disks, optical disks, tape, and memory cards. Such additional storage is illustrated in FIG. 12 by a data store 1240. In a particular aspect, at least a portion of the program data 1238 is stored at the data store 1240. Computer-readable or processor-readable storage media may include volatile and/or non-volatile storage and removable and/or non-removable media implemented in any technology for storage of information such as computer-readable instructions, data structures, program components or other data. The memory 132 and the data store 1240 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 1210. Any such computer storage media may be part of the computing device 1210.

The computing device 1210 may also have one or more input devices, such as an external device 1262 connected via one or more input interfaces 1260. The external device 1262 may include a key pad, a touchscreen, a microphone, an optical sensor, a mouse, etc. One or more output devices, such as a display 1206, speakers, a printer, etc. may also be connected to the computing device 1210 via one or more output interfaces 1270. The display 1206 may correspond to the display 108, the display 118, or both, of FIG. 1. The input interfaces 1260 and the output interfaces 1270 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain aspects, such as when the computing device 1210 is a server, the input interfaces 1260 and the output interfaces 1270 may not be included. The computing device 1210 has one or more communication interfaces 1280 that enable the computing device 1210 to communicate (e.g., via a network) with other computing devices 1222, such as the first device 102, the second device 104, the third device 106 of FIG. 1, or a combination thereof.

Particular aspects of disclosed techniques may be implemented in conjunction with a client-server architecture. To illustrate, the computing device 1210 may be an application server or other server that provides package management.

It will be appreciated that not all of the components or devices illustrated in FIG. 12 or otherwise described in the previous paragraphs are necessary to support aspects as herein described. It will also be appreciated that the computing device 1210 may have additional or different components or devices than illustrated in FIG. 12 or otherwise described in the previous paragraphs.

It should be noted that various functions performed by the one or more components of the systems described herein and the computing device 1210 are described as being performed by certain components or modules. This division of components and modules is for illustration only. In an alternate implementation, a function performed by a particular component or module may be divided amongst multiple components or modules. Moreover, in an alternate implementation, two or more components or modules of the systems described herein may be integrated into a single component or module. Each component or module illustrated in systems described herein may be implemented using hardware (e.g., a field-programmable gate array (FPGA) device, an application-specific integrated circuit (ASIC), a DSP, a controller, etc.), software (e.g., instructions executable by a processor), or any combination thereof.

Although the exemplary aspects described herein are intended to enable a person skilled in the art to practice such aspects, it should be understood that other aspects may be realized and that logical and physical changes may be made without departing from the scope of the present disclosure. Thus, the detailed description herein is presented for purposes of illustration only.

In one aspect, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various aspects.

As will be appreciated by one skilled in the art, some aspects may be embodied as a system, method, or computer program product. Accordingly, some aspect may take the form of an entirely hardware implementation, an entirely software implementation (including firmware, resident software, micro-code, etc.) or a combination of software and hardware aspects that may all generally be referred to herein as a "circuit," "module," or system." Furthermore, some aspects may take the form of a computer program product embodied in a tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc. Computer program code for carrying out operations of the disclosure may be written in any combination of one or more programming languages, including an object oriented programming language, such as Java, Smalltalk, C++, or the like, and conventional procedural programming languages, such as the "C" programming language, or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The network may include a wired network or a wireless network. The network may be configured in accordance with one or more wireless communication protocols, such as an Institute of Electrical and Electronics Engineers (IEEE) protocol, a Wi-Fi Alliance protocol, a Bluetooth® protocol, a Zigbee® protocol, a near-field communication protocol, an infrared communication protocol, a cellular protocol, a Long Term Evolution (LTE) protocol, or a combination thereof. Bluetooth is a registered trademark of Bluetooth Special Interest Group (SIG), and Zigbee is a registered trademark of Zigbee Alliance.

Various aspects are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create mans for implementing the functions/acts specified in the flowchart and/or block diagram block or blocks. The computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in FIGS. 1-12 illustrate the architecture, functionality, and operation of possible implementations of systems, methods, and computer program products according to various disclosed aspects. In this regard, each block in the flowchart or block diagrams may represent a module, a segment, or a portion of code, which includes one or more executable instructions for implementing the specified logical function(s). It should also be noted that, in some alternative implementations, the functions noted in the block may occur out of order noted in the FIGS. 1-12. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. Some implementations were chosen and described in order to explain the principles and practical application, and to enable others of ordinary skill in the art to understand various implementations with various modifications as are suited to particular uses contemplated.

The Abstract is not intended to be used in interpreting or limiting the scope or meaning of the claims. In addition, the disclosure is not to be interpreted as indicating that the claimed aspects require more features than are expressly recited in each claim. Thus, the present disclosure is not intended to be limited to the aspects shown herein but is to be accorded the widest scope possible consistent with the principles and novel features as defined by the following claims.

The invention claimed is:

1. A method comprising:

receiving, at a first device, a first file transmitted by a second device, wherein the first file includes a plurality of elements, but does not include information linking the plurality of elements to each other, and wherein the first file is associated with a first file identifier;

generating a second file at the first device based on information included in the first file, wherein the second file includes information linking one or more elements included in the first file to each other, and wherein the second file includes a file identifier associating the second file with the first file identifier;

receiving the first file and the second file at a third device;

generating, at the third device, a graphical user interface (GUI) based on the first file and the second file, the GUI indicating links between the one or more elements included in the first file, wherein the GUI includes at least one option that is selectable to initiate performance of an aggregate operation;

providing the GUI from the third device to a display;

performing a determination that the second file indicates that a first threshold total of a first attribute and a second threshold total of the first attribute are associated with a package identifier of a package, wherein each of the plurality of elements includes the first attribute, and wherein a total value corresponds to a sum of values of the first attribute; and generating, based on the determination, the GUI to indicate that the package includes the total value that is greater than or equal to the first threshold total and less than or equal to the second threshold total.

2. The method of claim 1, wherein the first file is represented in a markup language includes an extensible markup language (XML).

3. The method of claim 1, wherein performing the aggregate operation includes displaying the one or more elements included in the first file contiguously.

4. The method of claim 1, wherein performing the aggregate operation includes generating a purchase order based on the one or more elements included in the first file.

5. The method of claim 1, further comprising:

performing a determination that the second file indicates that each of a first element identifier of a first element of the plurality of elements and a second element identifier of a second element of the plurality of elements is associated with a package identifier of a package; and generating, based on the determination, the GUI to indicate that the package includes the first element and the second element.

6. The method of claim 1, further comprising:

performing a determination that the second file indicates that each of a first value of a first attribute and a second value of the first attribute is associated with a package identifier of a package, wherein each of the plurality of elements includes the first attribute; and generating, based on the determination, the GUI to indicate that the package includes one or more first elements of the plurality of elements and one or more second elements of the plurality of elements, wherein the first attribute of each of the one or more first elements has the first value, and wherein the first attribute of each of the one or more second elements has the second value.

7. The method of claim 1, further comprising:

performing a determination that the second file indicates that a threshold number of elements is associated with a package identifier of a package; and generating, based on the determination, the GUI to indicate that the package includes at least the threshold number of elements.

8. The method of claim 1, further comprising:

performing a determination that the second file indicates that a comment is associated with a package identifier of a package; and generating, based on the determination, the GUI to indicate that the comment is associated with the package.

9. A device comprising:

a first communications interface configured to receive a first file including a plurality of elements, but not including information linking the plurality of elements to each other, and wherein the first file is associated with a first file identifier; and a processor configured to:

generate a second file based on information included in the first file, the second file including: information linking one or more elements included in the first file to each other;

a file identifier associating the second file with the first file identifier;

a second communications interface configured to transmit both the first file and the second file to a third device configured to display a graphical user interface (GUI) based on the first file and the second file;

perform a determination that the second file indicates that a first threshold total of a first attribute and a second threshold total of the first attribute are associated with a package identifier of a package, wherein each of the plurality of elements includes the first attribute, and wherein a total value corresponds to a sum of values of the first attribute; and generate, based on the determination, the GUI to indicate that the package includes the total value that is greater than or equal to the first threshold total and less than or equal to the second threshold total.

10. The device of claim 9, wherein the first file includes element identifiers uniquely identifying each of the plurality of elements.

11. The device of claim 10, wherein the first file includes attribute values associated with the element identifiers.

* * * * *